US012486099B2

(12) United States Patent
Joung et al.

(10) Patent No.: US 12,486,099 B2
(45) Date of Patent: Dec. 2, 2025

(54) TABLET DISPENSER

(71) Applicant: ALGOCARE CORPORATION, Seoul (KR)

(72) Inventors: Ji Won Joung, Seoul (KR); Pil Lip Youn, Seoul (KR)

(73) Assignee: ALGOCARE CORPORATION, Seoul (KR)

( * ) Notice: Subject to any disclaimer, the term of this patent is extended or adjusted under 35 U.S.C. 154(b) by 0 days.

(21) Appl. No.: 18/558,221

(22) PCT Filed: Nov. 17, 2022

(86) PCT No.: PCT/KR2022/018250
§ 371 (c)(1),
(2) Date: Oct. 31, 2023

(87) PCT Pub. No.: WO2023/090919
PCT Pub. Date: May 25, 2023

(65) Prior Publication Data

US 2024/0217721 A1 Jul. 4, 2024

(30) Foreign Application Priority Data

Nov. 19, 2021 (KR) ........................ 10-2021-0160228
Apr. 4, 2022 (KR) ........................ 10-2022-0041736
May 18, 2022 (KR) ........................ 10-2022-0060755

(51) Int. Cl.
*B65D 83/04* (2006.01)
*A61J 1/03* (2023.01)
*A61J 7/02* (2006.01)

(52) U.S. Cl.
CPC ............ *B65D 83/0409* (2013.01); *A61J 1/03* (2013.01); *A61J 7/02* (2013.01); *B65D 2583/005* (2013.01); *B65D 2583/0404* (2013.01)

(58) Field of Classification Search
CPC .......... B65D 83/0409; B65D 2583/005; B65D 2583/0404; A61J 1/03; A61J 7/02
(Continued)

(56) References Cited

U.S. PATENT DOCUMENTS 2,526,615 A * 10/1950 Bedaux ................ B65D 47/265 221/269
3,511,409 A * 5/1970 Huck ................. B65D 83/0418 221/231
(Continued)

FOREIGN PATENT DOCUMENTS

JP 10-192367 A 7/1998
JP H10192367 A 7/1998
(Continued)

OTHER PUBLICATIONS

Non-announced data. Lotte Ventures Meeting. Sep. 8, 2021.
(Continued)

*Primary Examiner* — Michael G Lee
(74) *Attorney, Agent, or Firm* — NKL Law; Jae Youn Kim

(57) ABSTRACT

The present invention relates to a tablet dispenser. The tablet dispenser includes: an accommodation part provided with a plurality of cartridge accommodation compartments into which tablet cartridge assemblies configured to accommodate tablets therein and discharge the tablets and each provided with a discharge unit and a cartridge identification unit are inserted and mounted; a plurality of mounting detection units located in the respective cartridge accommodation compartments, and configured to detect the cartridge identification units of the tablet cartridge assemblies; a plurality of discharge driving units located in the respective cartridge accommodation compartments, and configured to drive the discharge units so that the tablets are discharged from the tablet cartridge assemblies; and a con-
(Continued)

trol unit connected to the mounting detection units and the discharge driving units, and configured to obtain information through the mounting detection units and control the discharge driving units.

20 Claims, 20 Drawing Sheets

(58) Field of Classification Search
USPC .......................................................... 221/222
See application file for complete search history.

(56) References Cited

U.S. PATENT DOCUMENTS

| | | | | |
|---|---|---|---|---|
| 8,453,874 | B2 * | 6/2013 | Simpson ................. | G07F 9/026 221/9 |
| 2006/0213921 | A1 | 9/2006 | Abdulhay et al. | |
| 2015/0090733 | A1 | 4/2015 | Park | |
| 2015/0225101 | A1 * | 8/2015 | Van Wijngaarden ........................ | G07F 17/0092 53/493 |
| 2018/0147120 | A1 | 5/2018 | Poirier et al. | |

FOREIGN PATENT DOCUMENTS

| | | | |
|---|---|---|---|
| JP | 1992-294723 | B2 | 6/1999 |
| JP | 2004290237 | A | 10/2004 |
| KR | 2020050029724 | B1 | 12/2005 |
| KR | 10-2014-0098455 | A | 8/2014 |
| KR | 20140098455 | A | 8/2014 |
| KR | 10-1443887 | B1 | 9/2014 |
| KR | 20140118201 | A | 10/2014 |
| KR | 10-2014-0147563 | A | 12/2014 |
| KR | 20140147563 | A | 12/2014 |
| KR | 2015-0014269 | A | 2/2015 |
| KR | 10-2016-0141884 | A | 12/2016 |
| KR | 20180031200 | A | 3/2018 |
| KR | 10-2019-0138546 | A | 12/2019 |

OTHER PUBLICATIONS

Non-announced data. Gmail "Algocare Company Introduction". Sep. 10, 2021.
Non-announced data. Gmail Lotte Holding IR Demonstration Meeting. Sep. 15, 2021.
Non-announced data. Lotte Holdings Meeting (Lotte World Tower). Oct. 14, 2021.
Non-announced data. Gmail "CES 2022 Letter of Invitation". Dec. 27, 2021.

* cited by examiner

TABLET DISPENSER

TECHNICAL FIELD

The present invention relates to a tablet dispenser.

BACKGROUND ART

Nutrients containing trace elements (zinc, iron, magnesium, and/or the like.) or vitamins are generally recognized as health supplements that supplement nutrients in the human body.

However, these nutrients may be used as treatments when necessary. When a nutrient is used as a treatment, the dosage thereof may be strictly limited depending on a patient's conditions.

For example, patients with osteomalacia must be prescribed vitamin D and take it. The dosage of vitamin D is determined according to the calcium concentration in the blood. In this case, when a patient with osteomalacia takes an excessive amount of vitamin D, side effects such as calcium stones or hypertensive disease may occur.

In addition, isonizid, which is used to treat tuberculosis, can rapidly consume niacin (nicotinic acid) contained in a patient's blood during the treatment of tuberculosis. When niacin deficiency occurs, a doctor determines the appropriate dosage of isoniazid for the patient based on the concentration of niacin in the patient's blood.

Likewise, there is a risk that a nutritional supplement taken for health may act as a drug that harm a user's health if taken incorrectly depending on the user's physical condition such as underlying disease. It is important to take a required type of nutritional supplement for the human body at a required dosage.

As described above, it is desirable to take tablets, such as health supplements or nutritional supplements or pills taken for treatment purposes, at an appropriate dosage at designated times according to a user's physical conditions.

However, it is difficult to accurately take tablets of a type that is suitable for a user.

In particular, when tablets are taken as health supplements such as nutritional supplements, they do not directly affect the current health of the human body unlike in the case of a disease. Accordingly, there are many cases in which users choose and take products at their own discretion instead of prescriptions from professionals such as pharmacists or doctors. Additionally, it is more difficult to consistently take corresponding tablets in an accurate way.

SUMMARY

Technical Problem

A problem to be solved by the present invention is to provide a tablet dispenser that makes it convenient and easy to take one or more tablets.

Another problem to be solved by the present invention is to increase user convenience by accurately and easily determining the status of a tablet dispenser.

Technical Solution

According to an example of the present invention, there is provided a tablet dispenser including: an accommodation part provided with a plurality of cartridge accommodation compartments into which tablet cartridge assemblies configured to accommodate tablets therein and discharge the tablets and each provided with a discharge unit and a cartridge identification unit are inserted and mounted; a plurality of mounting detection units located in the respective cartridge accommodation compartments, and configured to detect the cartridge identification units of the tablet cartridge assemblies; a plurality of discharge driving units located in the respective cartridge accommodation compartments, and configured to drive the discharge units so that the tablets are discharged from the tablet cartridge assemblies; and a control unit connected to the mounting detection units and the discharge driving units, and configured to obtain information through the mounting detection units and control the discharge driving units; wherein, when the tablet cartridge assemblies are inserted into the cartridge accommodation compartments, the discharge driving units are coupled to the discharge units, and the mounting detection units detect the cartridge identification units.

The driving depressions of the discharge units may be exposed in insertion directions in which the tablet cartridge assemblies are inserted into the cartridge accommodation compartments; and the driving shafts of the discharge driving units may be located in portions of the cartridge accommodation compartments that face the driving depressions of the inserted tablet cartridge assemblies.

The cartridge identification units may be exposed in the insertion directions, or may be exposed in directions different from the insertion directions; and the mounting detection units may be located in portions of the cartridge accommodation compartments that face the cartridge identification units of the inserted tablet cartridge assemblies, or may be located in portions of the cartridge accommodation compartments that face the cartridge identification units when the tablet cartridge assemblies are mounted into the cartridge accommodation compartments.

In the tablet cartridge assemblies, the cartridge identification units and driving depressions of the discharge units may be located to be exposed in insertion directions in which the tablet cartridge assemblies are inserted; the mounting detection units and driving shafts of the discharge driving units may be located to face the cartridge identification units of the tablet cartridge assemblies and the driving depressions of the discharge units; and, as the tablet cartridge assemblies are inserted, the driving shafts of the discharge driving units may be inserted and coupled into the driving depressions of the discharge units, and the mounting detection units may face the cartridge identification units.

The cartridge accommodation compartments may be provided to extend long in the respective insertion directions; and the mounting detection units and the driving shafts of the discharge driving units may be exposed out of the bottom surfaces of the cartridge accommodation compartments.

The mounting detection units may have elasticity in the insertion directions, and may be electrically or physically connected to the cartridge identification units.

A plurality of tablet discharge detection units configured to count the numbers of tables discharged from the respective tablet cartridge assemblies mounted in the cartridge accommodation compartments may be further provided in the cartridge accommodation compartments.

The tablet discharge detection units may be located under the respective cartridge accommodation compartments.

More specifically, the discharge units may be further provided with discharge pipes formed to extend in downward directions from the respective cartridge accommodation compartments and configured to discharge the tablets therethrough; and the tablet discharge detection units may be located adjacent to the discharge pipes.

When the tablet cartridge assemblies are mounted in the cartridge accommodation compartments, the discharge pipes may protrude out of the cartridge accommodation compartments; and the tablet discharge detection units may be located adjacent to portions of the discharge pipes that protrude out of the cartridge accommodation compartments.

The cartridge identification units may each include any one of a memory chip, a passive element, an identification mark, a radio frequency identification (RFID) chip for wireless frequency identification, and a near-field communication (NFC) chip for short-distance wireless communication.

The control unit may obtain cartridge information for the tablet cartridge assemblies by using the cartridge identification units; and the cartridge information may include at least one of cartridge identification information for the tablet cartridge assemblies and tablet information for tablets accommodated in the tablet cartridge assemblies.

The tablet dispenser may further include an information output unit connected to the control unit and configured to output the cartridge information input from the control unit.

The information output unit may include at least one of a display module and a sound output module.

When the tablet cartridge assemblies are accommodated in the cartridge accommodation compartments, the control unit may output the numbers of the cartridge accommodation compartments, in which the tablet cartridge assemblies are accommodated, and the tablet information of the tablet cartridge assemblies to the display module.

The control unit may output shape images of the cartridge accommodation compartments identical to the arrangement of the cartridge accommodation compartments to the display module.

The tablet dispenser may further include mounting state display units connected to the control unit and configured to display whether the tablet cartridge assemblies have been mounted in the cartridge accommodation compartments.

The control unit may calculate current remaining tablet quantity information by counting tablets discharged from the tablet cartridge assemblies using signals applied from the tablet discharge detection units.

The tablet dispenser may further include a sealing part driving unit connected to the control unit and configured to operate a sealing part that is located under the accommodation part and blocks the discharge passage of a hopper connected to the outside; and, when the discharging of tablets from the cartridge assemblies is completed, the control unit may operate the sealing part to block the discharge passage.

Advantageous Effects

According to these features, one or more tablets are automatically discharged according to the types and dosage of tablets to be taken according to a user's current physical conditions, thereby significantly improving user convenience.

In addition, the operating status of the tablet dispenser and the status of installed tablet cartridge assemblies may be determined in real time.

BRIEF DESCRIPTION OF DRAWINGS

FIG. 2 is a perspective view of a tablet dispenser according to an embodiment of the present invention, wherein

DETAILED DESCRIPTIONS OF EXEMPLARY EMBODIMENTS

Mode for Invention

Figure 1:
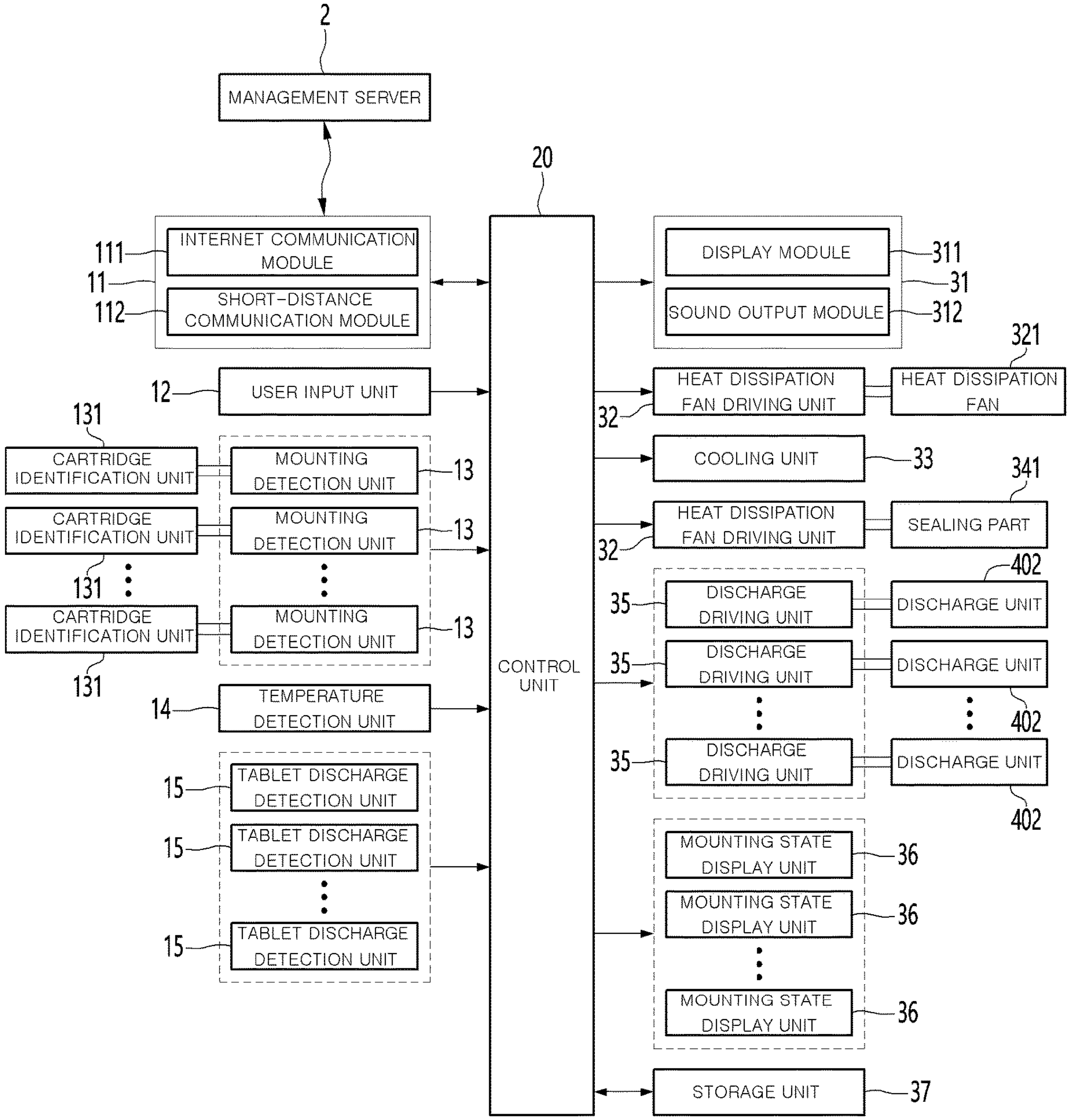
FIG. 1 is a schematic block diagram of a component configured to control the operation of a tablet dispenser according to an embodiment of the present invention.

The embodiments disclosed herein will be described in detail below with reference to the accompanying drawings. Regardless of the numbers of the drawings, identical or similar components will be given the same reference numerals and redundant descriptions thereof will be omitted. Additionally, in the description of the embodiments disclosed herein, when it is determined that a detailed description of a related known technology may obscure the gist of the embodiments disclosed herein, the detailed description will be omitted.

The terms each including an ordinal number, such as first, second, and/or the like, may be used to describe various components, but the components are not limited by the terms. The above terms are each used only for the purpose of distinguishing one component from another.

A singular expression includes a plural expression unless the context clearly dictates otherwise.

In the present application, the individual steps described may be performed regardless of a listed order, except for a case where individual steps need to be performed in a listed order due to a special causal relationship.

It should be understood that in the present application, the terms such as "include," "have," or the like are intended to designate the presence of features, numbers, steps, operations, components, parts, or combinations thereof described herein, but are not intended to exclude in advance the possibility of the presence or addition of one or more elements, numbers, steps, operations, components, parts, or combinations thereof.

A tablet dispenser according to an embodiment of the present invention will be described below with reference to the accompanying drawings.

In the present specification, a tablet T10 refers to a health supplement, such as a nutritional supplement, or a medicine made in a solid form according to the purpose of use or purpose thereof. The shapes of tablets may include various shapes such as circular, oval, cylindrical, and polygonal shapes, etc.

Referring to FIG. 1, a control circuit configured to control the operation of a tablet dispenser according to an embodiment of the present invention may include: a communication unit 11; a user input unit 12; a plurality of mounting detection units 13; a temperature detection unit 14; a plurality of tablet discharge detection units 15; a control unit 20 connected to the communication unit 11, the user input unit 12, the plurality of installation detection units 13, the temperature detection unit 14, and the plurality of tablet discharge detection units 15; an information output unit 31 connected to the control unit 20; a heat dissipation fan driving unit 32 and cooling unit 33 connected to the control unit 20; a sealing part driving unit 34 connected to the control unit 20; a plurality of discharge driving units 35 connected to the control unit 20; a plurality of mounting state display units 36 connected to the control unit 20; and a storage unit 37 connected to the control unit 20.

The component shown in FIG. 1 includes a plurality of tablet cartridge assemblies 40 configured to store different types of tablets T10. The component may be located in a tablet dispenser 1 that automatically dispenses at least one type of tablets T10 stored in at least one tablet cartridge assembly 40 in response to a user's operation.

Next, referring to FIGS. 2*a* to 5, an example of the tablet dispenser 1 according to the embodiment of the present invention will be described.

The plurality of tablet cartridge assemblies 40 are parts in each of which a corresponding type of tablets T10 are accommodated and stored, may all have the same structure, and may be accommodated in respective cartridge accommodation compartments H52 located inside the tablet dispenser 1.

Figure 2A:
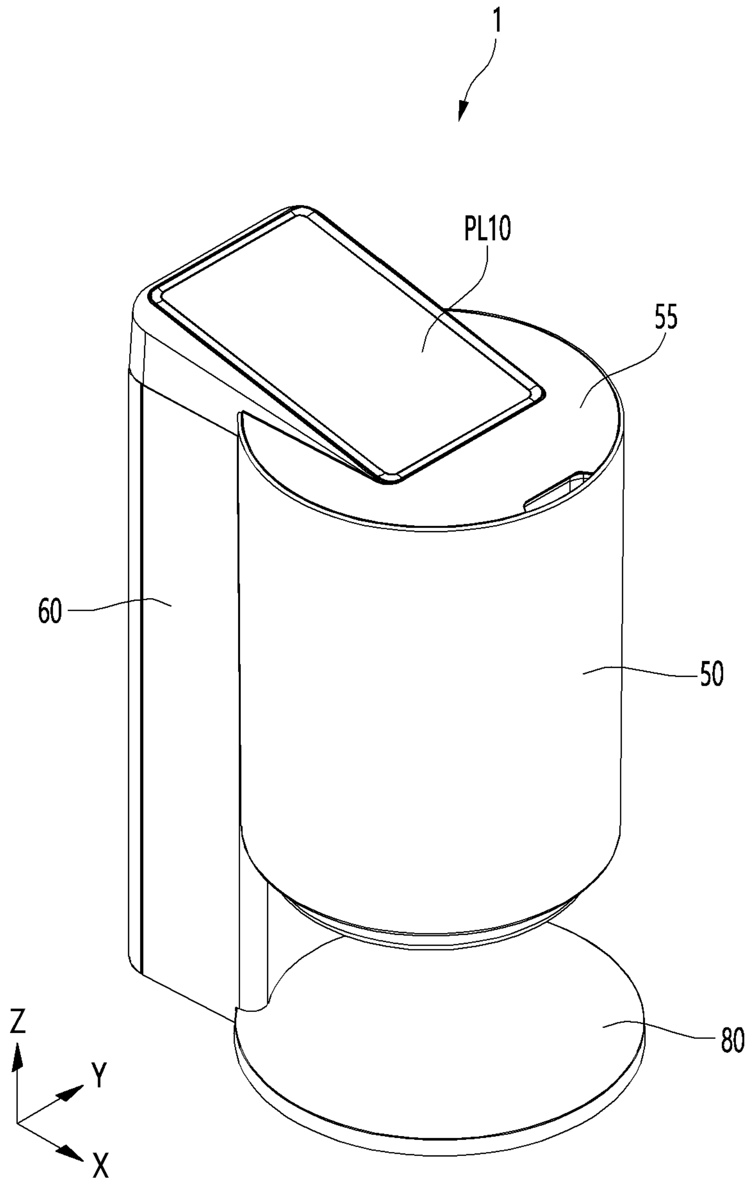
FIG. 2A is a perspective view of the tablet dispenser with the top cover closed.
Figure 2B:
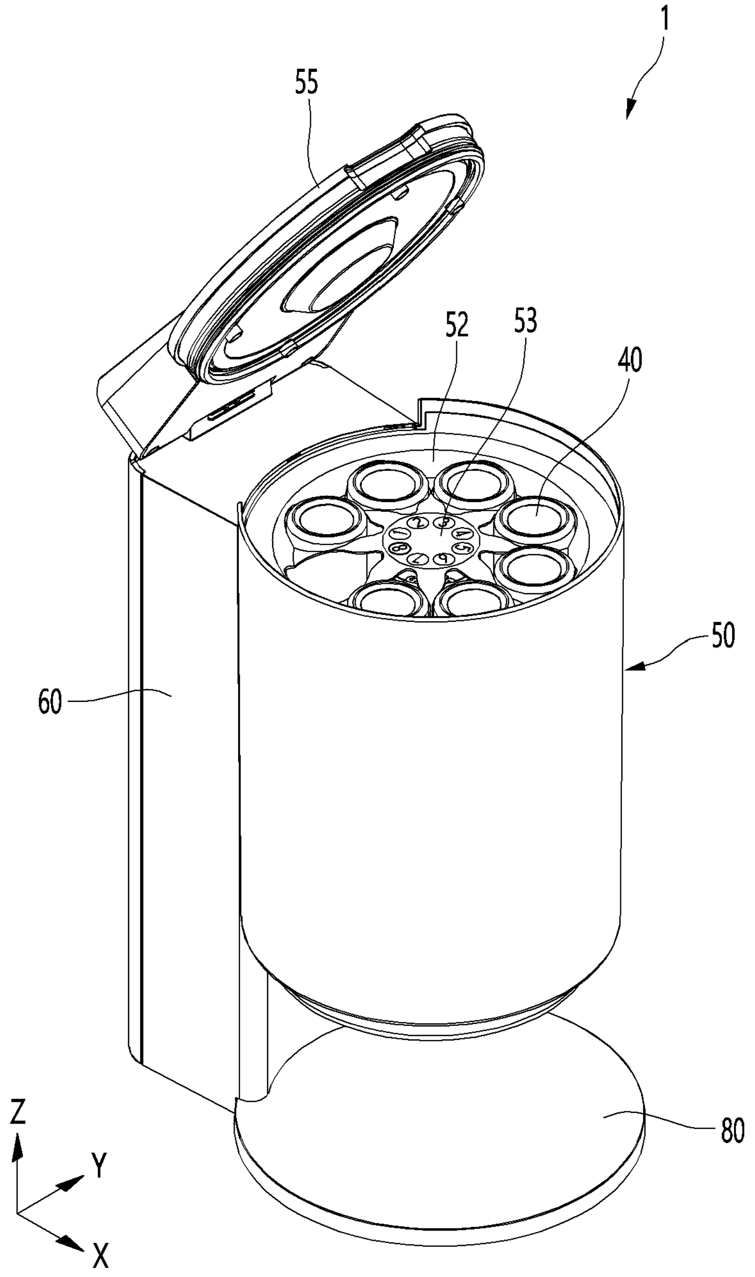
FIG. 2B is a perspective view of the tablet dispenser with the top cover open.
Figure 2C:
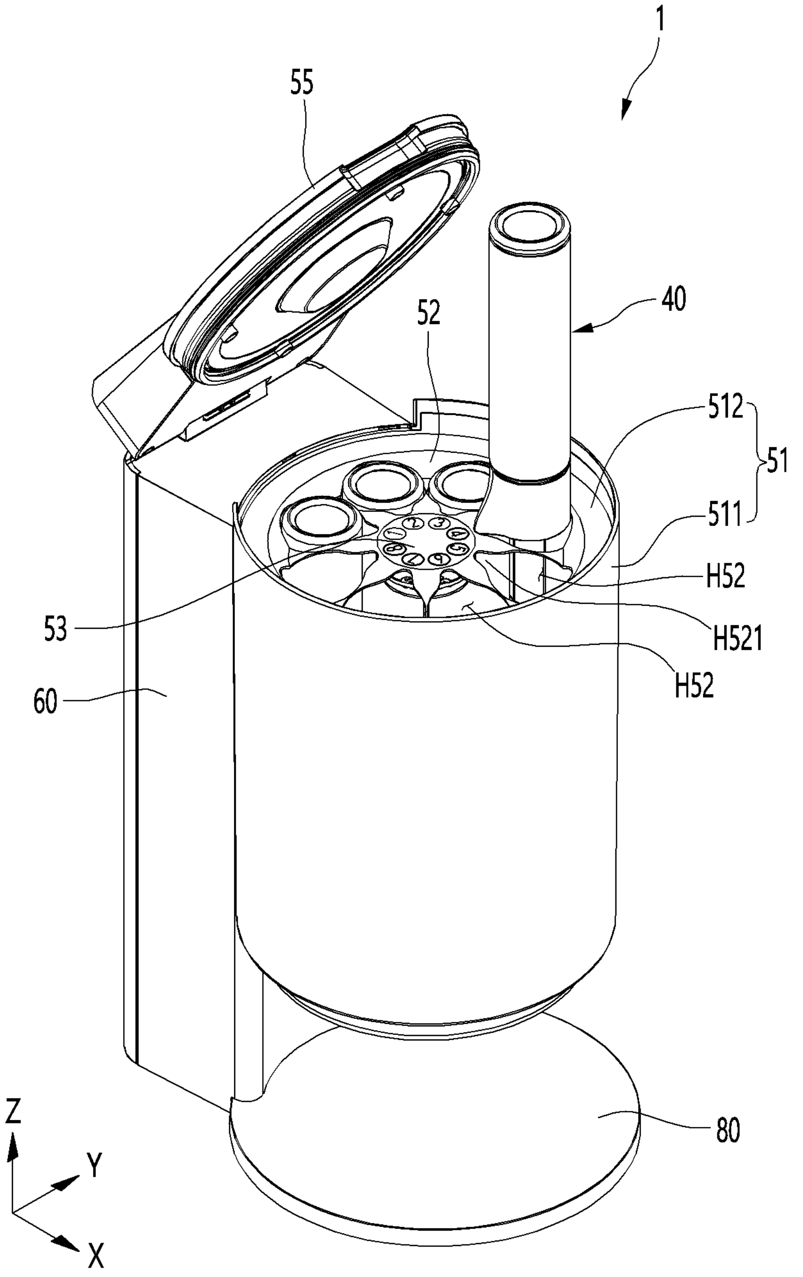
FIG. 2C is a view showing a state in which a tablet cartridge assembly is inserted into a cartridge accommodation compartment.

One example of the tablet dispenser 1 may include an accommodation unit 50, a body 60, and a support 80, as shown in FIGS. 2A to 2C.

In the present specification, for convenience of description, based on the tablet dispenser 1, the direction toward the front or rear of the tablet dispenser 1 is referred to as a first direction x, the direction crossing the first direction x in the horizontal direction is referred to as a second direction y, and the direction perpendicular to the first direction x and the second direction y is referred to as a third direction z.

Accordingly, based on the tablet dispenser 1 shown in FIG. 2A, the first direction x may be the front-rear direction of the tablet dispenser 1, the second direction y may be the left-right direction of the tablet dispenser 1, and the third direction z may be the height direction of the tablet dispenser 1.

The accommodation unit 50 is a part in which the plurality of tablet cartridge assemblies 40 each containing tablets T10 are inserted and accommodated, and may be located in the rear of the tablet dispenser 1 along the first direction x of the tablet dispenser 1.

For example, the accommodation unit 50 may have a substantially cylindrical shape, and may thus extend long along the third direction z and have a circular planar shape. Accordingly, the side surface of the accommodation unit 50 may have a curved surface.

Figure 3:
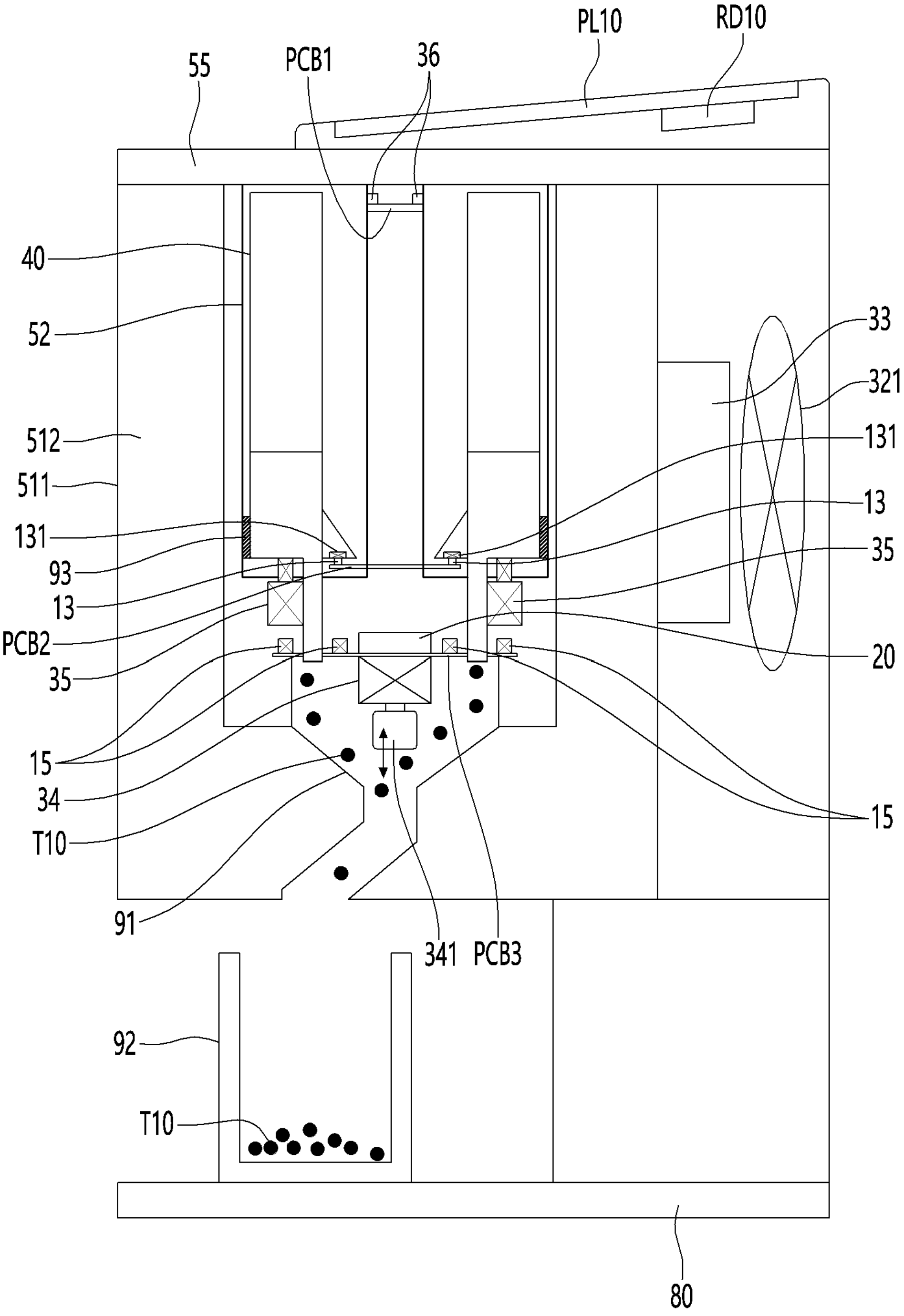
FIG. 3 is a schematic sectional view of a tablet dispenser according to an embodiment of the present invention.

As shown in FIGS. 2A to 3, this accommodation unit 50 may include a housing 51, an accommodation part 52 located within an internal space surrounded by the housing 51, and a plurality of mounting state display units 36 located in the central portion 53 of the accommodation part 52 and configured to display the mounting states of the tablet cartridge assemblies 40 within the accommodation part 52.

As shown in FIG. 2*c*, each of the plurality of mounting state display units 36 may be located in a portion corresponding to a corresponding one of the cartridge accommodation compartments H52 in the central portion 53, each of the mounting state display units 36 has a lighting device therein, and a number indicating the location of each of the cartridge accommodation compartments H52 may be marked on the surface of the central portion 53.

Accordingly, when the tablet cartridge assembly 40 is mounted, the mounting state display unit 36 corresponding to the cartridge accommodation compartment H52 in which the tablet cartridge assembly 40 has been mounted may be lit up.

The housing 51 may include a case 511 and an insulation portion 512 attached to the inner surface of the case 511.

The case 511 is intended to protect the accommodation unit 50, and may contain a material such as a synthetic material, e.g., plastic, or metal.

The shape of the case 511 is determined according to the shape of the accommodation unit 50. Accordingly, as an example, the case 511 may have a circular planar shape and a cylindrical shape with an open top and bottom.

The insulation portion 512 is used to maintain the internal temperature of the tablet dispenser 1, more specifically the internal temperature of the accommodation unit 50, at a predetermined temperature (e.g., 5° ° C. to 15° C.), and may contain an insulating material having an insulating effect.

The accommodation part 52 is a part configured such that the tablet cartridge assemblies 40 are inserted and mounted thereinto, and may have the plurality of cartridge accommodation compartments H52. In this example, the accommodation part 52 may be made of a synthetic material.

In an alternative example, the accommodation part 52 may contain an insulating material, in which case the insulating effect of the accommodation unit 50 can be further improved by the accommodation part 52.

As shown in FIGS. 2*b* and 2*c*, one tablet cartridge assembly 40 may be inserted and accommodated into each of the plurality of cartridge accommodation compartments H52, and the plurality of cartridge accommodation compartments H52 may be arranged radially around the central portion 53 of the accommodation part 52.

Each of the cartridge accommodation compartments H52 may have a depressed hole into which the tablet cartridge assembly 40 can be inserted. The depressed hole of each of the cartridge accommodation compartments H52 may extend long in the direction in which the tablet cartridge assembly 40 is inserted.

Furthermore, as an example, the plurality of cartridge accommodation compartments H52 may be arranged in a circle at the same distance from the central portion 53 of the accommodation part 52. The intervals between every two adjacent cartridge accommodation compartments H52 may also be the same.

As a result, when the tablets T10 are discharged from the tablet cartridge assemblies 40 inserted into the plurality of respective cartridge accommodation compartments H52, the present invention may equalize the times taken until the corresponding tablets T10 are discharged from the respective tablet cartridge assemblies 40 toward the support 80, which is outside the tablet dispenser 1, or may minimize the differences between the times.

The shapes and sizes of the respective cartridge accommodation compartment H52 are the same, the shapes and sizes of the respective cartridge accommodation compartment H52 may be determined depending on the planar shape of the tablet cartridge assemblies 40 to be inserted, and the respective cartridge accommodation compartment H52 may be provided to extend long in the direction in which the tablet cartridge assemblies 40 are inserted and mounted.

Although FIGS. 2*b*, 2*c*, and 3 illustrate the case in which the individual cartridge accommodation compartments H52 are provided to extend long in the third direction z, which is the vertical direction, the present invention is not limited thereto. The individual cartridge accommodation compartments H52 may be provided to extend long in the horizontal direction x or y crossing the vertical direction z. However, for convenience of description, the case in which the cartridge accommodation compartments H52 are provided to extend long in the vertical direction z will be described as an example.

As shown in FIGS. 2*b* and 2*c*, accommodation guides H521 configured to guide the tablet cartridge assemblies 40 through their insertion direction may be provided on one sides of the cartridge accommodation compartments H52.

In this case, the accommodation guides H521 may have a shape that protrudes toward the central portion 53 of the cartridge accommodation part 52. i.e., toward the mounting state display units 36. As shown in FIGS. 2*b* and 2*c*, each of the cartridge accommodation compartments H52 and each of the accommodation guides H521 may be connected to each other to form one insertion compartment.

Accordingly, a user may rapidly and accurately determine the direction, in which the tablet cartridge assemblies 40 are inserted, by using the accommodation guides H521. Therefore, user convenience may be improved by ensuring the smooth insertion operation of the tablet cartridge assemblies 40.

In FIGS. 2*b* and 2*c*, the number of the plurality of cartridge accommodation compartments H52 is 8 as an example, but it is not limited to this and may be changed, so that the number of the plurality of cartridge accommodation compartments H52 may be larger or smaller than 8.

Referring to FIG. 3, a first circuit board PCB1 on which the plurality of mounting state display units 36 are located may be located in the upper end of the central portion 53 surrounded by the plurality of tablet cartridge assemblies 40.

Furthermore, a second circuit board PCB2 on which the plurality of mounting detection units 13 are located may be located in the lower portion of the plurality of cartridge accommodation compartment H52 in which the plurality of tablet cartridge assemblies 40 are mounted. A third circuit board PCB3 on which the control unit 20, the plurality of tablet discharge detection units 15, and the sealing part driving unit 34 are located may be located below the second circuit board PCB2.

As shown in FIG. 3, a hopper 91 configured to collect the tablets T10 discharged from corresponding tablet cartridge assemblies 40 and discharge them to the outside is located below the plurality of tablet cartridge assemblies 40, i.e., the accommodation part 52. Accordingly, the hopper 91 allows at least one type of tablets T10 to be discharged into a collection cup 92 that can be located on the support 80.

In this case, the hopper 91 may have a funnel shape, and may thus allow the tablets T10, discharged from the tablet cartridge assemblies 40, to stably move downward toward the collection cup.

As shown in FIG. 3, the third circuit board PCB3 may be located in the hopper 91.

At least one damper part 93 protruding toward each cartridge accommodation compartment H52 may be located on a side of the accommodation part 52 in contact with the corresponding cartridge accommodation compartment H52.

The damper part 93 may be inserted into the corresponding cartridge accommodation compartment H52 and come into close contact with the outer side of the accommodated tablet cartridge assembly 40.

Accordingly, the damper parts 93 may serve to prevent the tablet cartridge assemblies 40 inserted into the cartridge accommodation compartments H52 from shaking and being damaged due to the vibration generated by the operation of the discharge driving unit 35, or the like, and may also serve to increase the close contact force between the cartridge accommodation compartments H52 and the tablet cartridge assemblies 40.

Accordingly, the damper parts 93 may be made of a rubber material that alleviates and absorbs a generated shock.

Next, referring to FIGS. 4A and 5, an example of the tablet cartridge assembly 40 inserted into each cartridge accommodation compartment H52 will be described.

As already described, the plurality of tablet cartridge assemblies 40 mounted in the accommodation unit 50 may have the same structure.

Figure 4A:
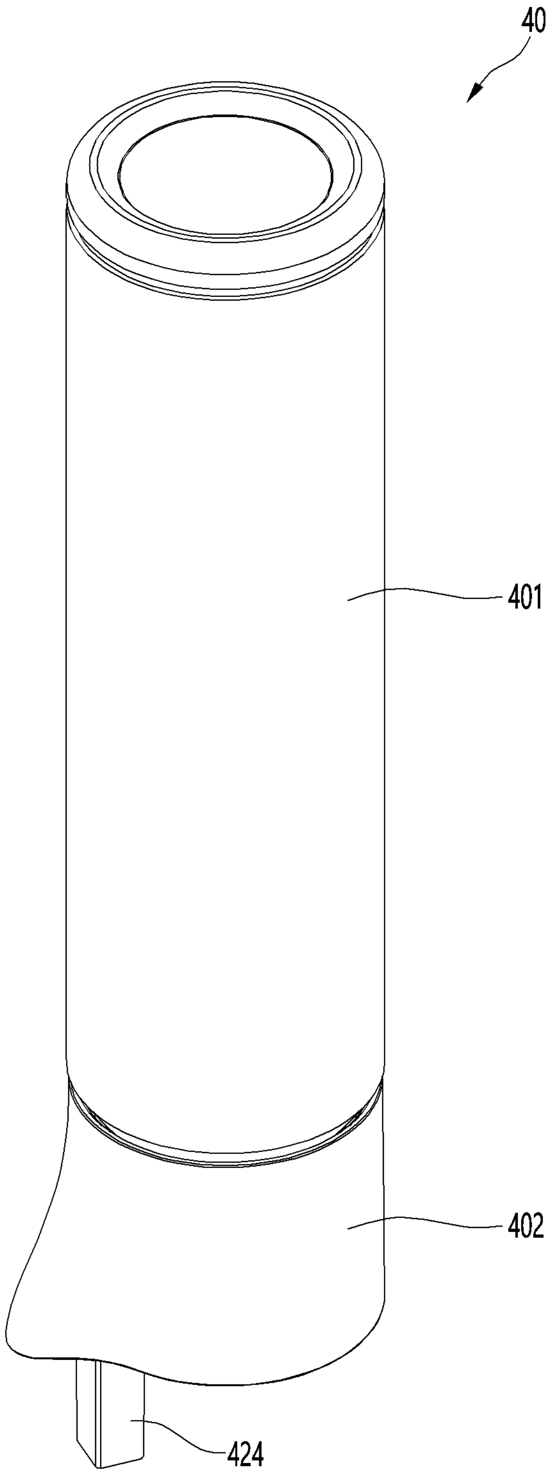
FIGS. 4A and 4B are perspective views of a tablet cartridge assembly of a tablet dispenser according to an embodiment of the present invention, which are perspective views acquired in different directions.
Figure 5:
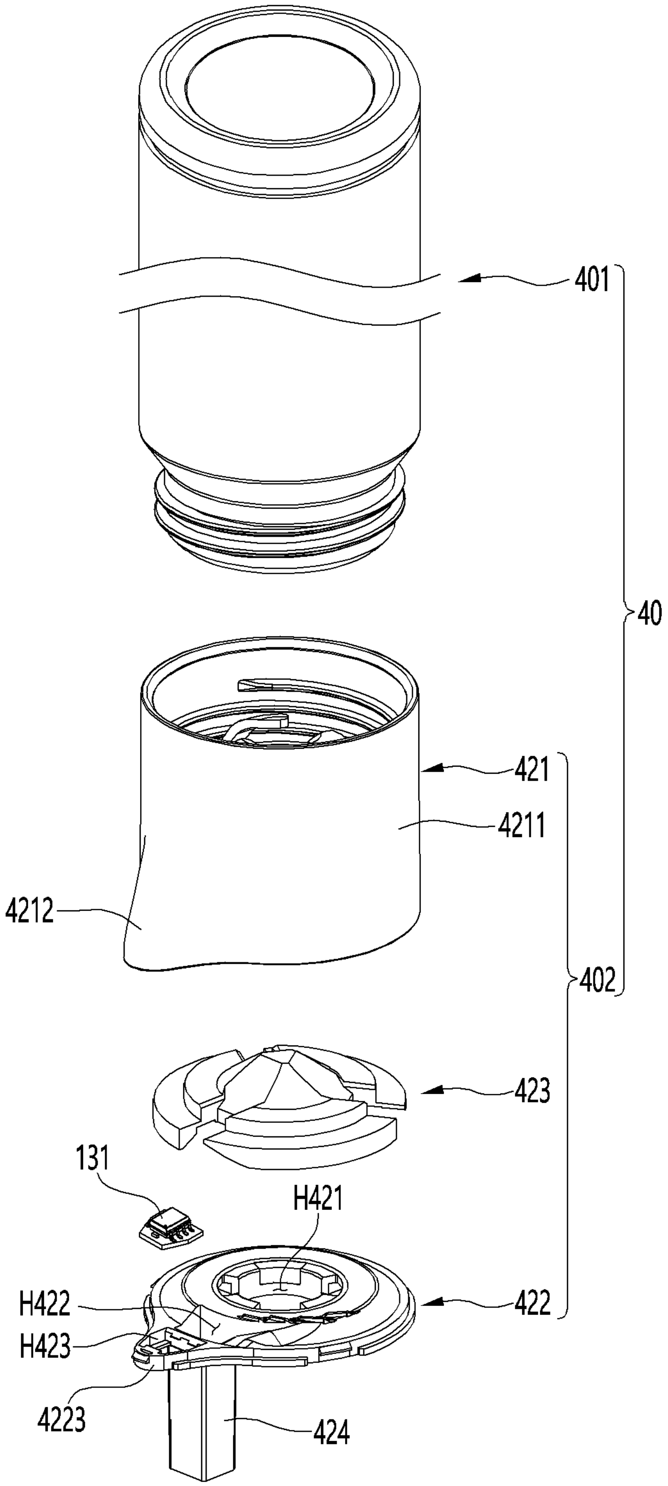
FIG. 5 is an exploded perspective view of the tablet cartridge assembly shown in FIG. 4A.

An example of each of the tablet cartridge assemblies 40 may include a cartridge 401 and a discharge unit 402, as shown in FIGS. 4A and 5. The cartridge 401 may accommodate the tablets T10. The discharge unit 402 may be coupled with the cartridge 401 and discharge the tablets, contained in the cartridge, to the outside.

A plurality of cartridges 401 belonging to the respective tablet cartridge assemblies 40 may store different types of tablets T10 containing different nutritional ingredients (e.g., vitamin A, vitamin C, lutein, omega-3, and the like).

The hardness of these tablets T10 may be larger than a reference value (e.g., 2.4 kp), and may have a value sufficient to prevent damage such as damage or breakage from occurring due to collision or shock during a discharge operation by the tablet dispenser 1 of the present example.

Furthermore, the tablets T10 of the present example have an appropriate maximum width and maximum height. The ratio between the maximum width and the maximum height is formed in an appropriate range, so that the tablets T10 can have a structure that can be easily discharged to the outside through the tablet dispenser 1 according to the present example.

One cartridge 401 may be coupled with one discharge unit 402.

Accordingly, under the control of the control unit 20, the operations of the individual discharge units 402 may be performed individually and independently, and whether the tablets T10 stored in each cartridge 401 are to be discharged and the number of tablets T10 to be discharged may be determined.

The cartridges 401 may each have a substantially circular sectional shape and a cylindrical shape with a space for storing the tablets T10 therein, and may be coupled to one of the discharge units 402 located below it through screw connection or the like.

The discharge units 402 each include a housing 421 coupled to the cartridge 401, a discharge cap 422 coupled to the housing 421 on the bottom of the housing 421, and a rotor unit 423 located between the discharge cap 422 and the housing 421 and coupled to the discharge cap 422.

The housing 421 may include a body 4211 and an accommodation guide protrusion 4212 protruding from a portion of the outer side of the body 4211.

The body 4211 may has a circular planar shape having an empty space in the middle thereof, and may also have a cylindrical shape having open top and bottom ends and extending in the third direction z.

This body 4211 may form the outer wall of the housing 421, and may be provided with threads on the inner surface thereof for coupling with the cartridge 401 located above it. The body 4211 may provide a sealed space inside so that a plurality of tablets stored in the cartridge 401 can be located on the rotor unit 423.

The first accommodation guide protrusion 4212 is intended to guide the tablet cartridge assembly 40, inserted into the cartridge accommodation compartment H52, through its insertion direction, and may be a portion inserted into the accommodation guide H521 of the corresponding cartridge accommodation compartment H52.

Accordingly, a user may determine the insertion direction of the tablet cartridge assembly 40 so that the first storage guide protrusion 4212 can be inserted into the accommodation guide H521 of the corresponding cartridge accommodation compartment H52, and may then insert the tablet cartridge assembly 40 into the corresponding cartridge accommodation compartment H52.

The discharge cap 422 may be coupled with the housing 421 and partially block the open lower portion of the opened body 4211.

This discharge cap 422 includes a rotor insertion opening H421 located in the center, a discharge outlet H422 located in a portion of the edge having a multi-stage structure located to surround the rotor insertion opening H421, an accommodation guide protrusion 4223 protruding outward from a portion of the edge and including an identification unit mounting hole H423, and a discharge pipe 424 seamlessly connected to the discharge outlet H422 and extending downward.

The discharge outlet H422 and the discharge pipe 424 may provide a passage for discharging the tablet T10, moved along the outer periphery of the discharge cap 422 by the rotor unit 423, out of the tablet cartridge assembly 40. However, the discharge pipe 424 is not essential and may be omitted in some cases.

As shown in FIG. 5, the corresponding cartridge identification unit 131 may be mounted into the identification unit mounting hole H423. The cartridge identification unit 131 may be used to identify the mounted tablet cartridge assembly 40 when the tablet cartridge assembly 40 is mounted in the cartridge accommodation compartment H52. In other words, the present invention may obtain cartridge information about the tablet cartridge assembly 40 using the cartridge identification unit 131.

The cartridge information may include at least one of cartridge identification information for the tablet cartridge assembly and tablet information for the tablets accommodated in the tablet cartridge assembly.

The cartridge identification unit may be provided to include any one of a memory chip, a passive element, an identification mark, a radio frequency identification (RFID) chip, and a near-field communication (NFC) chip.

Figure 4B:
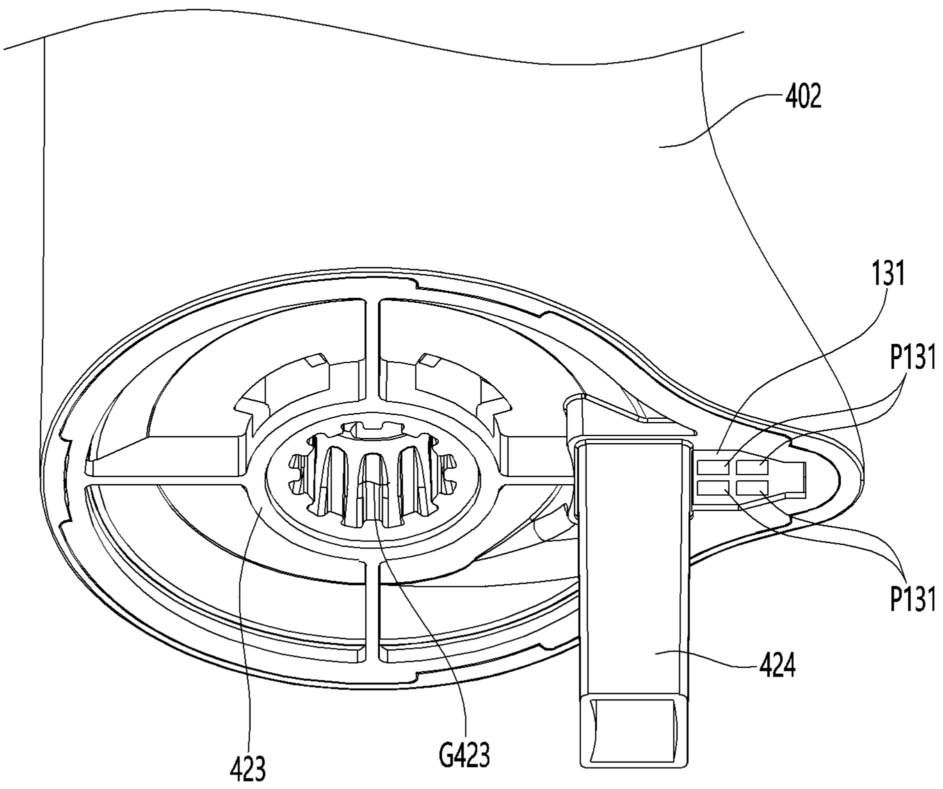

For example, in the case where the cartridge identification unit 131 is provided in the form of a memory chip, the terminals of the cartridge identification unit 131 may be exposed out of the bottom of the discharge cap 422 when the cartridge identification unit 131 is mounted into the identification unit mounting hole H423 of the discharge cap 422, as shown in FIG. 4*b*.

In this case, the terminals P131 of the cartridge identification unit 131 are intended to output identification information for the corresponding cartridge identification unit 131.

Since this cartridge identification unit 131 is mounted onto the discharge cap 422 of the discharge unit 402, it may form a component of the corresponding tablet cartridge assembly 40.

Figure 6A:
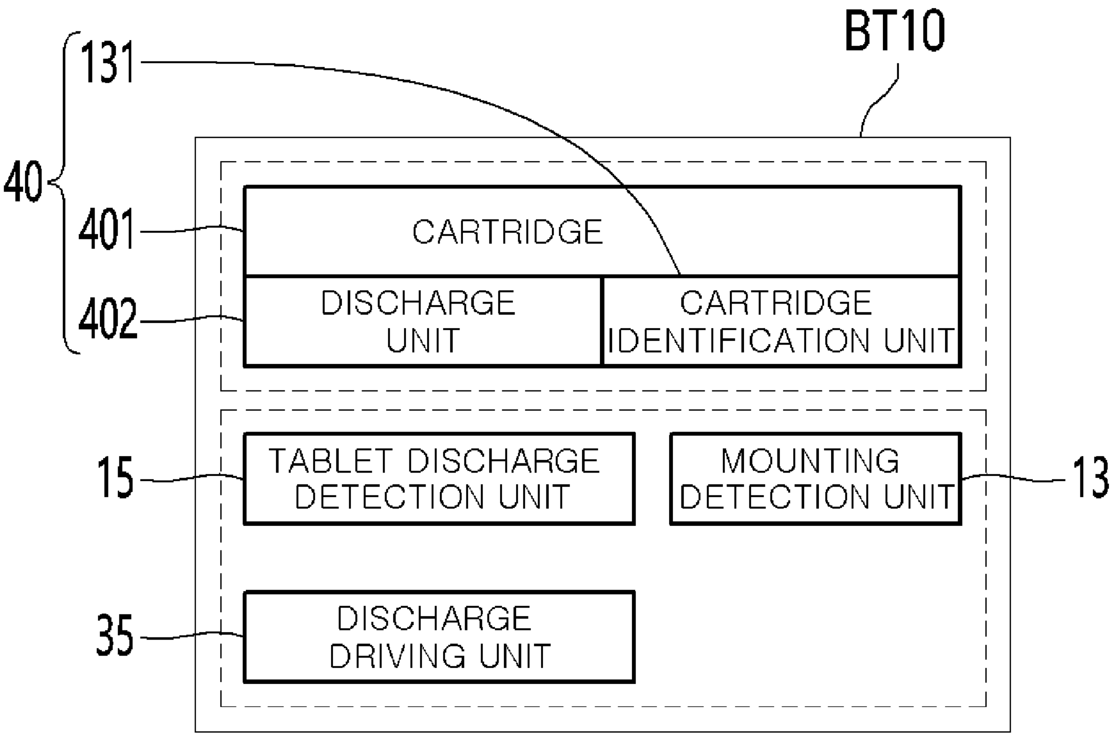
FIG. 6A is a diagram showing components constituting one tablet bottle unit mounted in a tablet dispenser according to an embodiment of the present invention.
Figure 6B:
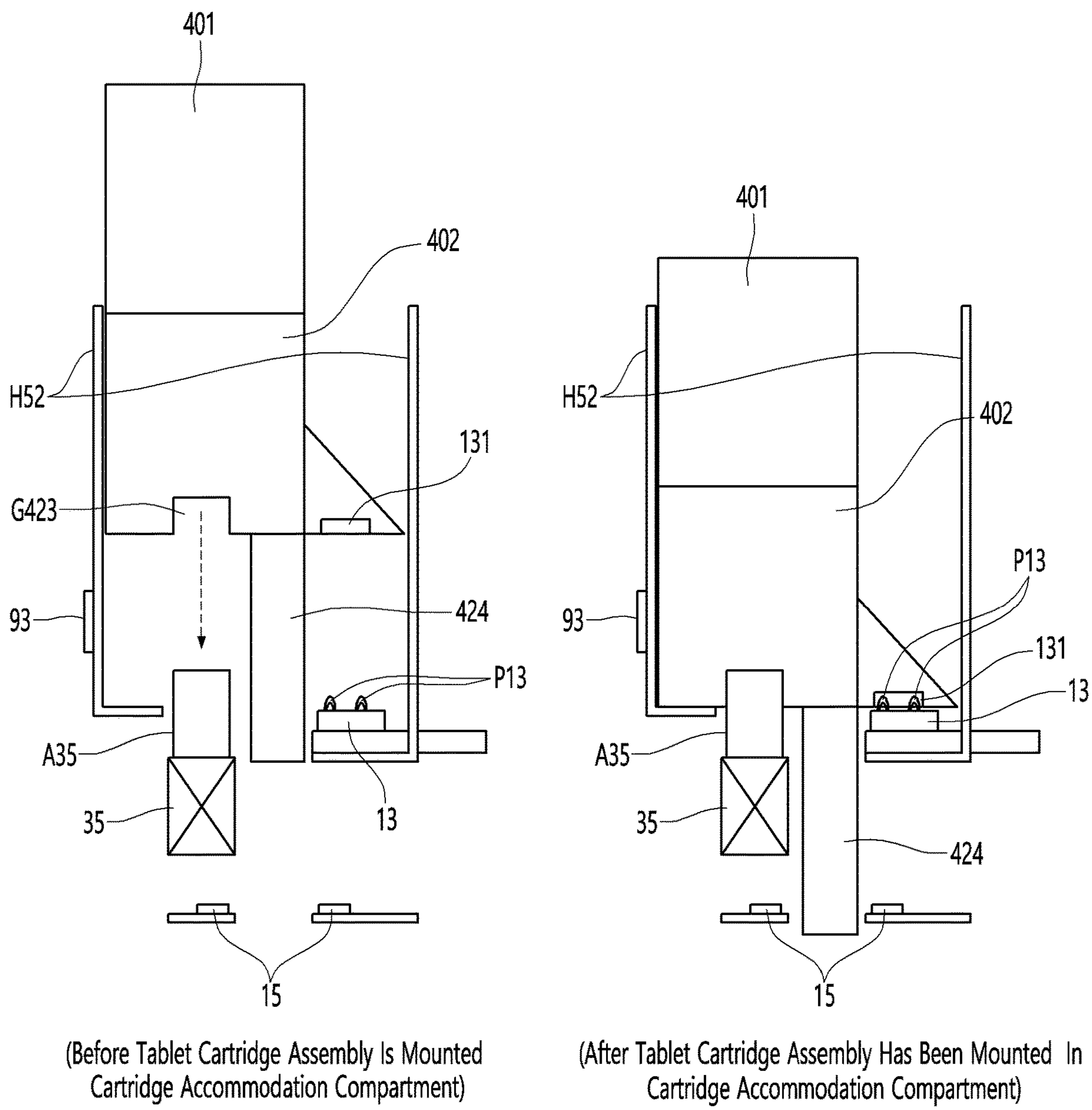
FIG. 6B is a diagram schematically showing views before and after a tablet cartridge assembly is mounted in an accommodation compartment in a tablet dispenser according to an embodiment of the present invention.

As an example, as shown in FIG. 6B, when the cartridge identification unit 131 is provided in the form of a memory chip, the cartridge identification unit 131 may be electrically connected to the corresponding mounting detection unit 13 located on the second circuit board PCB2 through these terminals P131.

For example, the terminals P131 of the cartridge identification unit 131 may be electrically connected to the corresponding mounting detection unit 13. Through this electrical connection, the cartridge identification unit 131 may output a corresponding signal to the installation detection unit 13 through the terminals P131.

Accordingly, the installation detection unit 13 may output the signal, applied from the cartridge identification unit 131, to the control unit 20 through the terminals in a contact state. In order to electrically connect the cartridge identification unit 131 and the installation detection unit 13, the cartridge identification unit 131 and the installation detection unit 13 located in the same tablet cartridge assembly 40 may face each other on opposite sides.

Furthermore, referring to FIG. 3, the tablet discharge detection unit 15 configured to determine the number of tablets discharged from the corresponding tablet cartridge assembly 40 may be located adjacent to the discharge pipe 424. The tablet discharge detection units 15 may be mounted on the third circuit board PCB3, as already described.

The rotor unit 423 is inserted into the rotor insertion opening H421, and may selectively rotate forward and reverse along the edge of the discharge cap 422 to discharge one or more corresponding tablets.

To this end, a driving depression G423 into and with which the driving shaft A35 of the discharge driving unit 35 is inserted and engaged may be located in the lower part of the rotor unit 423, as shown in FIG. 4*b*.

The driving depression G423 of each of the rotor units 423 may be physically connected to the driving shaft A35 of the corresponding discharge driving unit 35. Accordingly, the rotor unit 423 may be rotated in a determined direction by the operation of the discharge driving unit 35 that rotates in the corresponding direction under the control of the control unit 20. The one or more tablets T10 may be discharged by the rotation of the rotor unit 423.

In this case, due to the rotational operation of the rotor unit 423, the one or more tablets T10 located within the housing 421 may be discharged to the outside one by one through the discharge outlet H422 of the discharge cap 422 while being lowered and rotated along the rotor unit 423 having a substantially triangular pyramid shape.

The discharge unit 402 may serve to discharge the one or more tablets T10, filled in the cartridge 401, to the outside one by one.

The present invention is not limited to the structure of the discharge unit 402 described with reference to FIGS. 4A to 5. However, the present invention may be applied to any other structure as long as it can discharge the one or more tablets T10 one by one even when the structure of the discharge unit 402 is different from that shown in FIGS. 4A and 5.

In the discharge unit 402 of the tablet cartridge assembly 40 used in the present invention, the driving depression G423 of the rotor unit 423 and the cartridge identification unit 131 may be located on the same surface of the tablet cartridge assembly 40 or may be exposed toward the same direction.

For example, as shown in FIG. 4B, the driving depression G423 of the rotor unit 423 and the cartridge identification unit 131 may be located in the lower portion of the tablet cartridge assembly 40, or may be exposed toward the direction (e.g., the downward direction) in which the tablet cartridge assembly 40 is inserted.

However, the present invention is not necessarily limited to this. The driving depression G423 of the rotor unit 423 may be located in the lower portion of the tablet cartridge assembly 40, but the cartridge identification unit 131 may be located on the side of the tablet cartridge assembly 40.

As described above, when each tablet cartridge assembly 40 provided with the discharge unit 402 and the cartridge identification unit 131 is inserted into each cartridge accommodation compartment H52 of the accommodation part 52, each tablet cartridge assembly 40 is coupled with one mounting detection unit 13 configured to identify each tablet cartridge assembly 40, one discharge driving unit 35 configured to drive the discharge unit of each tablet cartridge assembly 40, and one tablet discharge detection unit 15 configured to detect the number of tablets T10 discharged from each tablet cartridge assembly 40, as shown in FIG. 6A, thereby forming one tablet bottle unit BT10.

Each of the plurality of discharge driving units 35 may be connected to each tablet cartridge assembly 40, is intended to control the rotational movement of the rotor unit 423 provided in the tablet cartridge assembly 40, and may also have a motor and a motor driving circuit configured to drive the motor.

The plurality of discharge driving units 35 may be located to correspond to respective cartridge accommodation compartments H52, and may serve to drive the discharge units 402 so that the tablets are discharged from the table cartridge assemblies 40. Accordingly, when the tablet cartridge assemblies are inserted into the cartridge accommodation compartments, the discharge driving units may be coupled with the discharge units.

Accordingly, under the control of the control unit 20, the rotor unit 423 may be selectively rotated forward and reverse by the corresponding discharge driving unit 35 connected to the rotor unit 423. Through the rotation of the rotor unit 423, a predetermined number of tablets T10 accommodated in the tablet cartridge assembly 40 may be discharged.

The plurality of mounting detection units 13 are located in the respective cartridge accommodation compartments H52, as shown in FIGS. 3, 6A, and 6B, and may serve to detect the cartridge identification units 131 of the tablet cartridge assemblies.

When the tablet cartridge assembly 40 is inserted and mounted into the cartridge accommodation compartment H52, the mounting detection unit 13 may be located in a portion facing the cartridge identification unit 131 within the cartridge accommodation compartment H52.

In the present invention, when the tablet cartridge assembly 40 is inserted into the cartridge accommodation compartment H52, the discharge driving unit 35 may be coupled with the discharge unit, and the installation detection unit 13 may detect the cartridge identification unit 131.

To this end, when the tablet cartridge assembly 40 is inserted into the cartridge accommodation compartment H52, the driving depression of the discharge unit is exposed in the insertion direction in which the tablet cartridge assembly 40 is inserted into the cartridge accommodation compartment H52, and the driving shaft of the discharge driving unit 35 located in the cartridge accommodation compartment H52 may be located to face the driving depression of the discharge unit.

Furthermore, when the tablet cartridge assembly 40 is inserted into the cartridge accommodation compartment H52, the cartridge identification unit 131 may be provided in a portion of the tablet cartridge assembly 40 so that it can be exposed in the insertion direction or in a direction different from the insertion direction.

For example, when the cartridge identification unit 131 is provided in a portion of the tablet cartridge assembly 40 to be exposed in the insertion direction (e.g., the arrow direction in FIG. 6B, the mounting detection unit 13 may be positioned to face the inserted cartridge identification unit 131.

In this case, as shown in FIG. 6B, as an example, the installation detection unit 13 and the driving shaft of the discharge driving unit 35 are exposed through the bottom surface of the cartridge accommodation compartment H52, and are also exposed in a direction opposite to the insertion direction.

When the recessed hole of the cartridge accommodation compartment H52 is provided long in the vertical direction, as shown in FIG. 3, the installation detection unit 13 and the driving shaft of the discharge driving unit 35 may be provided to be exposed through the bottom surface of the cartridge accommodation compartment H52 in the vertical direction.

However, unlike in FIG. 3, when the recessed hole of the cartridge accommodation compartment H52 is provided long in the horizontal direction, the installation detection unit 13 and the driving shaft of the discharge driving unit 35 may be provided to be exposed through the bottom surface of the cartridge accommodation compartment H52 in the horizontal direction.

As another example, when the cartridge identification unit 131 is provided in a portion of the tablet cartridge assembly 40 to be exposed in a direction other than the insertion direction, the installation detection unit 13 is located in the cartridge accommodation compartment H52, and may also be located in a portion facing the cartridge identification unit 131 when the tablet cartridge assembly 40 is completely inserted into the cartridge accommodation compartment H52.

In FIG. 6A, the installation detection unit 13 is located in a portion corresponding to the cartridge identification unit and may be physically or electrically connected within the cartridge accommodation compartment H52, the discharge driving unit 35 may be physically connected to the driving depression G423 of the discharge unit 402 through the driving shaft A35, and the tablet discharge detection unit 15 may be located adjacent to the discharge pipe 424 of the discharge unit 402.

More specifically, the driving shaft A35 of the discharge driving unit 35 and the connection terminals of the installation detection unit 13 may be exposed in a direction facing the tablet cartridge assembly 40 from the bottom surface of the cartridge accommodation compartment H52.

As an example, as shown in FIG. 6B, the driving shaft A35 of the discharge driving unit 35 and the connection terminals of the installation detection unit 13 may be located on the bottom surface of the cartridge accommodation compartment H52 and exposed upward. Additionally, the tablet discharge detection unit 15 may be located below the cartridge accommodation compartment H52.

Accordingly, as the tablet cartridge assembly 40 is inserted into the cartridge accommodation compartment H52 as shown in FIG. 6A and thus the driving shaft A35 of the discharge driving unit 35 of the driving depression G425 is inserted into the discharge unit 402 as shown in FIG. 6B, the terminals P131 of the cartridge identification unit 131 naturally come into contact with the connection terminals P13 of the mounting detection unit 13, so that the mounting detection unit 13 and the cartridge identification unit 131 may be electrically connected to each other.

As the driving shaft A35 of the discharge driving unit 35 is inserted into the driving depression G423 of the discharge unit 402, the discharge pipe 424 of the tablet cartridge assembly 40 may be located to penetrate the tablet discharge detection unit 15.

Accordingly, in the present embodiment, when the tablets T10 are discharged through the discharge pipe 424, the number of tablets T10 discharged may be counted in real time using the tablet discharge detection unit 15.

Although the case where the driving shaft A35 of the discharge driving unit 35 and the connection terminals P13 of the mounting detection unit 13 are located on the bottom surface of the cartridge accommodation compartment H52 has been described as an example in FIG. 6B, the present invention is not necessarily limited thereto.

For example, when the driving depression G423 of the rotor unit 423 is located in the lower portion of the tablet cartridge assembly 40 and the cartridge identification unit 131 is located on the side surface, the driving shaft A35 of the driving unit 35 may be located on the bottom surface of the cartridge accommodation compartment H52, and the discharge mounting detection unit 13 may be located on the side surface.

The body 60 may be located attached in the rear of the tablet dispenser 1, and may include the cooling unit 33 and cooling fan configured to refrigerate accommodation part 52 where at least one mounted tablet cartridge assembly 40 is located.

The cooling unit 33 and the cooling fan are intended to lower the temperature of the accommodation unit 50, and may be a Peltier cooler using a Peltier device. The cooling fan may be rotated by a motor or the like, and may generate wind to reduce the temperature inside the accommodation unit 50 and discharge the heated air from the accommodation unit 50 to the outside.

The support 80 is located under the accommodation unit 50 and is intended to enable the tablet dispenser 1 to be stably positioned in a designated position. The support 80 may be located to face the bottom of the hopper 91 having an open bottom, as shown in FIG. 3.

Referring back to FIG. 1, the components constituting the tablet dispenser 1 will be described in detail.

First, the communication unit 11 is intended to communicate with another device such as an externally located management server 2, and may be provided with an Internet communication module 111 and a short-distance communication module 112.

The Internet communication module 111 refers to a module for wireless or wired Internet access. As an example, using the Internet communication module 111, the tablet dispenser 1 may communicate with an externally located management server 2 and perform the operations of transmitting and receiving necessary data.

Wireless LAN (WLAN) (Wi-Fi network), Wireless broadband (Wibro), World Interoperability for Microwave Access (Wimax), or High Speed Downlink Packet Access (HSDPA) may be used as Internet technology.

The short-range communication module 112 refers to a module for short-range communication.

NFC, Bluetooth, Radio Frequency Identification (RFID), infrared Data Association (IrDA), Ultra-Wideband (UWB), ZigBee, and a magnetic or resonance induction method may be used as short-distance communication technology.

The user input unit 12 is intended to input data or commands required for the operation of the tablet dispenser 1, and may be a touch panel or operation switches.

The information input to the control unit 20 through the user input unit 12 may be at least one of user identification information, a user's current physical conditions (e.g., information related to a physical and mental state), and user basic information (e.g., at least one of age, gender, medical history, the medication taken, and occupation).

In this case, the basic user information may be input through the user input unit 12 of the tablet dispenser 1, may be transmitted to the management server 2 by the control unit 20 of the tablet dispenser 1, and may be stored in a database or the like to correspond to user identification information.

In an alternative example, user identification information may be input to the control unit 20 through a short-distance communication module 112, such as an NFC or RFID module. In this case, a user places the tag that he or she possesses on the reader RD10 of the short-distance communication module 112 mounted on the tablet dispenser 1 so that the user identification information stored in the tag can be transmitted to the control unit 20 through the reader RD10.

As already described, the plurality of mounting detection units 13 detect whether the tablet cartridge assemblies 40 are appropriately mounted in the corresponding cartridge accommodation compartment H52 by detecting the states of the respective cartridge accommodation compartments H52, and output the detection signals of the corresponding states.

Accordingly, each of the mounting detection units 13 may transfer the detection signal of the corresponding state to the control unit 20 depending on whether it is electrically and physically connected to the cartridge identification unit 131 mounted on the identification unit mounting hole H423 of each tablet cartridge assembly 40.

As an example, in the case of the tablet dispenser 1 according to the present example, the cartridge identification unit 131 may be a storage medium such as a memory chip that stores information about the tablet cartridge assembly 40 on which it is mounted, i.e., cartridge information. In this case, the cartridge information stored in the cartridge identification unit 131 includes cartridge identification information, which is the identification information of the corresponding tablet cartridge assembly 40, and information about the tablets contained in the corresponding tablet cartridge assembly 40, i.e., tablet information. In this case, the tablet information may be at least one of the type of tablets (e.g., vitamin C), the manufacturing date and time of the tablets, the distribution period of the tablets, the initial tablet quantity, and the current tablet remaining quantity information of the corresponding cartridge assembly 40. In this case, the current tablet remaining quantity information may be the ratio of the currently remaining tablet quantity to the initial table quantity.

When the cartridge identification unit 131 is a storage medium as described above, power terminals GND and VCC for power supply, a data terminal DATA for the input and output of data, and a clock terminal CLK for the input of clock signals may be located on the lower surface of the cartridge identification unit 131.

For connection with the mounting detection unit 13 located on the top surface of the second circuit board PCB2, the cartridge identification unit 131 may be located such that the terminals GND, VCC, DATA, and CLK are exposed to the mounting detection unit 13 on the bottom of the corresponding tablet cartridge assembly 40, as shown in FIGS. 4B and 6B. Accordingly, when the corresponding tablet cartridge assembly 40 is accommodated in the corresponding cartridge accommodation compartment H52, is lowered to a predetermined location through the cartridge accommodation compartment H52, and is normally installed in the corresponding cartridge accommodation compartment H52, the corresponding cartridge identification unit 131 and mounting detection unit 13 may be electrically and physically connected to each other.

Accordingly, the installation detection unit 13 may receive a signal corresponding to the information stored in the connected cartridge identification unit 131 and output it to the control unit 20. The control unit 20 may determine cartridge information for the corresponding tablet cartridge assembly 40 by using the state of a signal transferred from the installation detection unit 13.

In the present example, the mounting detection unit 13 may be provided with connection terminals for connection to the terminals VCC, GND, DATA, and CLK of the exposed cartridge identification unit 131, as shown in FIGS. 3 and 6B.

These connection terminals may be positioned to be exposed upward on the top surface of the mounting detection unit 13, and may come into contact with the terminals GND, VCC, DATA, and CLK exposed on the bottom surface of the cartridge identification unit 131 located on the opposite side.

The mounting detection unit 13 may have elasticity in the direction in which the tablet cartridge assembly 40 is inserted into the cartridge accommodation compartment H52.

For example, when the cartridge identification unit 131 is provided in the form of a memory chip as shown in FIG. 6B, the installation detection unit 13 may include the connection terminals P13 that are physically connected to the memory chip.

In this case, the connection terminals P13 of the mounting detection unit 13 may be provided to protrude in a direction facing the direction in which the tablet cartridge assembly 40 is inserted. In other word, the connection terminals P13 of the mounting detection unit 13 protrude in a direction in which they come into contact with the cartridge identification unit 131, and may have elasticity that enables buffering by a predetermined width in the protruding direction.

Accordingly, even when the tablet cartridge assembly 40 is slightly moved by the operation of the discharge driving unit 35 while the tablet dispenser 1 discharges one or more tablets, the connection between the mounting detection unit 13 and the cartridge identification unit 131 may be prevented from being released Unlike in this example, the cartridge identification unit 131 may be made of a passive element such as a resistor. In this case, the cartridge identification unit 131 may simply show cartridge identification information for the corresponding tablet cartridge assembly 40 using the value output from the passive element.

In another example, the cartridge identification unit 131 may be formed of an element for wireless short-distance communication such as an identification mark such as a QR code, a radio frequency identification (RFID) tag, or a near-field communication (NFC) tag. In this case, the mounting detection unit 13 may be an identification mark reader (e.g., a photographing device) or a tag reader (e.g., an RFID reader or an NFC reader), and may thus read the cartridge information stored in the cartridge identification unit 131 and transfer it to the control unit 20.

When the installation detection unit 13 is a reader as described above, the installation detection unit 13 may generate cartridge information using the information read from the cartridge identification unit 131 and then output it to the control unit 20.

To control the rotation speed of the heat dissipation fan 321, the temperature detection unit 14 may detect the temperature inside the accommodation part 52 or the housing 51 and output the temperature detection signal of the corresponding state to the control unit 20.

Accordingly, the control unit 20 may control whether the heat dissipation fan 321 is to be rotated and the rotation speed of the heat dissipation fan 321 and operate the cooling unit 33 by controlling the operation of the heat dissipation fan driving unit 32 and the operation of the cooling unit 33.

The plurality of tablet discharge detection units 15 may each serve to count the number of tablets discharged from the tablet cartridge assembly mounted in each cartridge accommodation compartment H52.

Each of the discharge detection units may be located under each of the plurality of cartridge accommodation compartment H52.

As an example, as shown in FIGS. 3 and 6B, when the discharge unit is provided with a discharge pipe 424 extending in the downward direction from each cartridge accommodation compartment H52, the discharge detection unit 15 may be located adjacent to the discharge pipe.

Accordingly, as shown in FIG. 6B, when the tablet cartridge assembly is mounted in the cartridge accommodation compartment H52, the discharge pipe 424 may protrude outward in the downward direction from the cartridge accommodation compartment H52, and the discharge detection unit may be located adjacent to a portion of the discharge pipe 424 protruding outward from the cartridge accommodation compartment H52.

As an example, as shown in FIG. 6B, when the discharge detection unit 15 includes a light emission unit and a light reception unit, the discharge pipe 424 may be located between the light emission unit and the light reception unit in the state in which the tablet cartridge assembly is mounted.

Accordingly, when one or more tablets are discharged from each tablet cartridge assembly, the tablet discharge detection unit 15 detects the tablets T10 discharged through the discharge pipe 424 and then outputs a signal for whether the tablets have been discharged to the control unit 20, so that the control unit 20 can count the number of tablets discharged from the corresponding tablet cartridge assembly 40.

Accordingly, each of the tablet discharge detection units 15 may be located below or near each cartridge assembly 40, as described with reference to FIG. 3.

An example of this tablet discharge detection unit 15 may detect the discharged tablet T10 using light.

To this end, the tablet discharge detection unit 15 may be provided with an optical sensor including a light emission unit configured to emit light and an optical sensor including a light reception unit configured to receive light. In this case, the discharge pipe 424 may be made of a transparent material that transmits light, such as transparent plastic.

As an example, the light emission unit may be a light emitting diode (LED), and the light reception unit may be a photo transistor.

Accordingly, the light emission unit and the light reception unit may be located on both sides of the discharge pipe 424 facing each other from opposite sides.

For this reason, when the tablets T10 are discharged through the discharge pipe 424, the light reception unit may be blocked by the discharged tablets T10 and may not be able to receive the light output from the light emission unit.

Due to this, the light reception unit may output a signal of a corresponding state to the control unit 20 depending on whether the light output from the light emission unit has been received. The control unit 20 may determine whether the tablets T10 have been discharged by using a signal applied from the light reception unit.

The control unit 20 controls the overall operation of the tablet dispenser 1, and may be a processor.

For example, when each tablet cartridge assembly is inserted into the cartridge accommodation compartment H52, the control unit 20 may obtain information through the installation detection unit. More specifically, the control unit 20 may determine cartridge information for each tablet cartridge assembly 40 by using a signal applied from each installation detection unit 13, and may output it to the information output unit 31.

Furthermore, the control unit 20 may count the number of tablets discharged from a corresponding tablet cartridge assembly 40 by using a signal applied from each tablet discharge detection unit 15, may determine the number of tablets present in each tablet cartridge assembly 40, and may update the number of tablets in real time.

Moreover, when user identification information and a user's current physical conditions are input through the user input unit 12, the control unit 20 may transmit the input user identification information and current physical conditions to the management server 2 via the communication unit 11.

Accordingly, the management server 2 may read basic user information corresponding to the user identification information, transmitted from the tablet dispenser 1, from a database or the like, may conceive a tablet combination by using the current physical conditions and the basic user information, and may then transmit the results of the tablet combination to the tablet dispenser 1.

In this case, the results of the tablet combination may be customized tablet information suitable for the user's current physical conditions, such as the types of tablets to be currently taken, the dosage of the tablets, and/or the like.

In this way, when the results of the tablet combination are transmitted from the management server 2, the control unit 20 may control the operation of the corresponding discharge driving unit 35 to discharge a corresponding dosage of tables T10, and may also output the transmitted results of the tablet combination to the information output unit 31.

Furthermore, the control unit 20 may control the display of the current status of each tablet cartridge assembly 40, e.g., whether the tablet cartridge assembly 40 has been accommodated in each cartridge accommodation compartment H52, the type of tablets stored in each tablet cartridge assembly 40, the current remaining tablet quantity information (%) of the corresponding tablet cartridge assembly 40, and/or the like. Image data for the images related to the display data displayed by the information output unit 31 under the control of the control unit 20 may already be stored in the storage unit 37.

The operation of this control unit 20 will be described in detail below.

The information output unit 31 may output at least one of visual information and aural information under the control of the control unit 20, and may include a display module 311 and a sound output module, as shown in FIG. 1.

The display module 311 displays an image corresponding to the image data, output from the control unit 20, on the screen according to the operation of the control unit 20.

Due to this, the display module 311 may display images related to cartridge information and current status for each tablet cartridge assembly 40, the results of a tablet combination, and/or the like, as already described.

The display module 311 includes at least one display device selected from a liquid crystal display, an organic light emitting diode display, a flexible display, and a three-dimensional (3D) display.

When the display module 311 is formed of a touch panel, the display module 311 of the present example serves as an input device such as the user input unit 12, as well as an output device configured to output images.

As described above, the touch panel PL10 having the functions of the display module 311 and the user input unit 12 may be located on the top of the tablet dispenser 1, e.g., on the top cover 55, as shown in FIG. 3.

Buttons for the input of data (e.g., user basic information, user identification information, and a user's current physical conditions) required to control the operation of the tablet dispenser 1 may be displayed on the touch panel PL10.

The reader RD10 capable of inputting user identification information by using an RFID or NFC tag may be located in the touch panel PL10.

The sound output module outputs an audio signal, output from the control by the operation of the control unit 20, as a voice. In this case, the information output as a voice may be at least part of the information output to the display module 311, such as cartridge information and current status for each tablet cartridge assembly 40, and the results of a tablet combination.

In this way, a user may check information related to the tablet dispenser 1 not only visually but also aurally, so that user convenience can be improved.

This sound output module 252 may be provided with a speaker and/or the like.

The heat dissipation fan driving unit 32 allows the inside of the tablet dispenser 1 to be maintained at an appropriate temperature by driving the heat dissipation fan 321 mounted on the tablet dispenser 1. The cooling unit 33 is also mounted inside the tablet dispenser 1, and is intended to adjust the internal temperature of the tablet dispenser 1.

In this case, the heat dissipation fan driving unit 32 is intended to rotate the heat dissipation fan 321, and may be provided with a motor and a motor driving circuit configured to control the operation of the motor.

Therefore, when the temperature detected by the temperature detection unit 14 increases above a set temperature in the state in which the sealing part 341 blocks the discharge passage P91 of the hopper 91 connected to (i.e., communicating with) the outside, the control unit 20 allows the internal temperature of the tablet dispenser 1 to be maintained below the set temperature by driving the heat dissipation fan driving unit 32 and the cooling unit 33.

As a result, the problems in which the tablets T10 stored in the tablet cartridge assembly 40, which is a closed space, are damaged or the efficacy of the tablets is deteriorated due to temperature may be prevented from occurring.

The sealing part driving unit 34 is intended to drive the sealing part 341, and may also be provided with a motor and a motor driving circuit configured to drive the motor.

In the present example, before discharging the corresponding tablets from at least one of the plurality of tablet cartridge assemblies 40 according to the results of a tablet combination, the scaling part 341 moves in a predetermined direction and opens the blocked discharge passage P91 of the hopper 91. Due to this, the tablets T10 discharged from the corresponding tablet cartridge assembly 40 may be introduced into the collection cup located below the hopper 91.

To this end, before controlling the operation of discharging one or more tablets from the tablet cartridge assembly 40 according to the results of a tablet combination, the control unit 20 first rotates the corresponding motor in a predetermined direction (e.g., clockwise) by outputting a driving signal to the scaling part driving unit. Accordingly, the sealing part 341 is raised to a predetermined position to open the discharge passage P91 of the hopper 91 by the operation of the scaling part driving unit.

When the operation of discharging tablets from all of one or more tablet cartridge assemblies 40 according to the results of a tablet combination is completed, the control unit 20 may rotate the motor in the opposite direction (e.g., counterclockwise) by outputting the driving signal of a corresponding state to the scaling part driving unit to lower the sealing part 341 to a predetermined position. Accordingly, the discharge passage P91 of the hopper 91, which has been maintained in an open state, may be closed by the sealing part 341 by the operation of lowering the scaling part 341.

The plurality of mounting state display unit 36 may display whether corresponding tablet cartridge assemblies 40 have been normally accommodated in the cartridge accommodation compartments H52.

Accordingly, the control unit 20 may determine whether a corresponding tablet cartridge assembly 40 has been normally accommodated in each cartridge accommodation compartments H52 using a signal applied from each installation detection unit 13, and may determine whether a corresponding mounting state display unit will be lit up according to the results of the determination.

Accordingly, each mounting state display unit may selectively remain lit up and put out depending on the state of a signal applied from the control unit 20.

For this reason, when a tablet cartridge assembly 40 has been normally accommodated in each cartridge accommodation compartment H52 of the accommodation part 52, a mounting state display unit corresponding to the tablet cartridge assembly 40 may be lit up.

In the present example, numerals (e.g., 1 to 8) corresponding to the numbers of the respective tablet cartridge assemblies 40 (i.e., the corresponding accommodation compartments H52) are printed on the portions of the accommodation part 52 located above the plurality of respective mounting state display units, and the portions on which the numerals are printed may be made of a transparent material that allows light to pass therethrough. Accordingly, when a mounting state display unit located below each of the printed numerals remains lit up, light passes through the transparent numeral portion, so that the numeral (e.g., 2) corresponding to the mounted tablet cartridge assembly 40 may remain lit up.

As a result, a user or a manager may visually easily check the types of tablet cartridge assemblies 40 accommodated in the accommodation part 52 by using the lit numerals.

Alternatively, the lighting color of the corresponding mounting state display unit may vary depending on whether a tablet cartridge assembly 40 has been normally accommodated in a corresponding cartridge accommodation compartment H52.

As an example, when the corresponding tablet cartridge assembly 40 has been normally mounted in the cartridge accommodation compartment H52, the corresponding mounting state display unit may emit light of a first color (e.g., green). In contrast, when the corresponding tablet cartridge assembly 40 is not appropriately mounted in the cartridge accommodation compartment H52 or the cartridge accommodation compartment H52 is empty, the mounting state display unit corresponding to the cartridge accommodation compartment H52 may emit light of a predetermined second color (e.g., red) different from the first color.

Each of these mounting state display units may include a light emission unit such as a light emitting diode. As already described, the number of mounting state display units may be the same as the number of cartridge accommodation compartments H52.

In the present example, each of the plurality of mounting detection units 13 and each of the plurality of mounting state display units located in the respective tablet cartridge assemblies 40 are directly connected to the control unit 20.

However, unlike in the above case, in an alternative example, a data selection circuit such as a multiplexer may be additionally located between the plurality of mounting detection units 13 and the control unit 20 and/or between the control unit 20 and the plurality of mounting state display units, and may control the connection state between the plurality of mounting detection units 13 and the control unit 20 and/or between the control unit 20 and the plurality of mounting state display units. In this case, the number of wires is considerably reduced, so that the manufacturing cost is reduced, with the result that circuit design can be more facilitated and simplified.

The storage unit 37 may be a storage medium, such as memory, in which data intended to control the operation of each tablet cartridge assembly 40 and data generated during the operation are stored. Accordingly, the control unit 20 may control the operation of the tablet dispenser 1 by using the data stored in the storage unit 37.

The management server 2 communicating with the tablet dispenser 1 may be mounted with basic user information for each user using the tablet dispenser 1, a driving program for the operation of the tablet dispenser 1, and a program for a tablet combination, and may perform corresponding operations.

This management server 2 may also be provided with a communication unit configured to communicate with the tablet dispenser 1, a control unit, i.e., a processor for controlling operations, and a storage unit.

Next, referring to FIGS. 7 to 12C, the operation of the information output device of the tablet dispenser 1 having the above configuration will be described.

Figure 7:
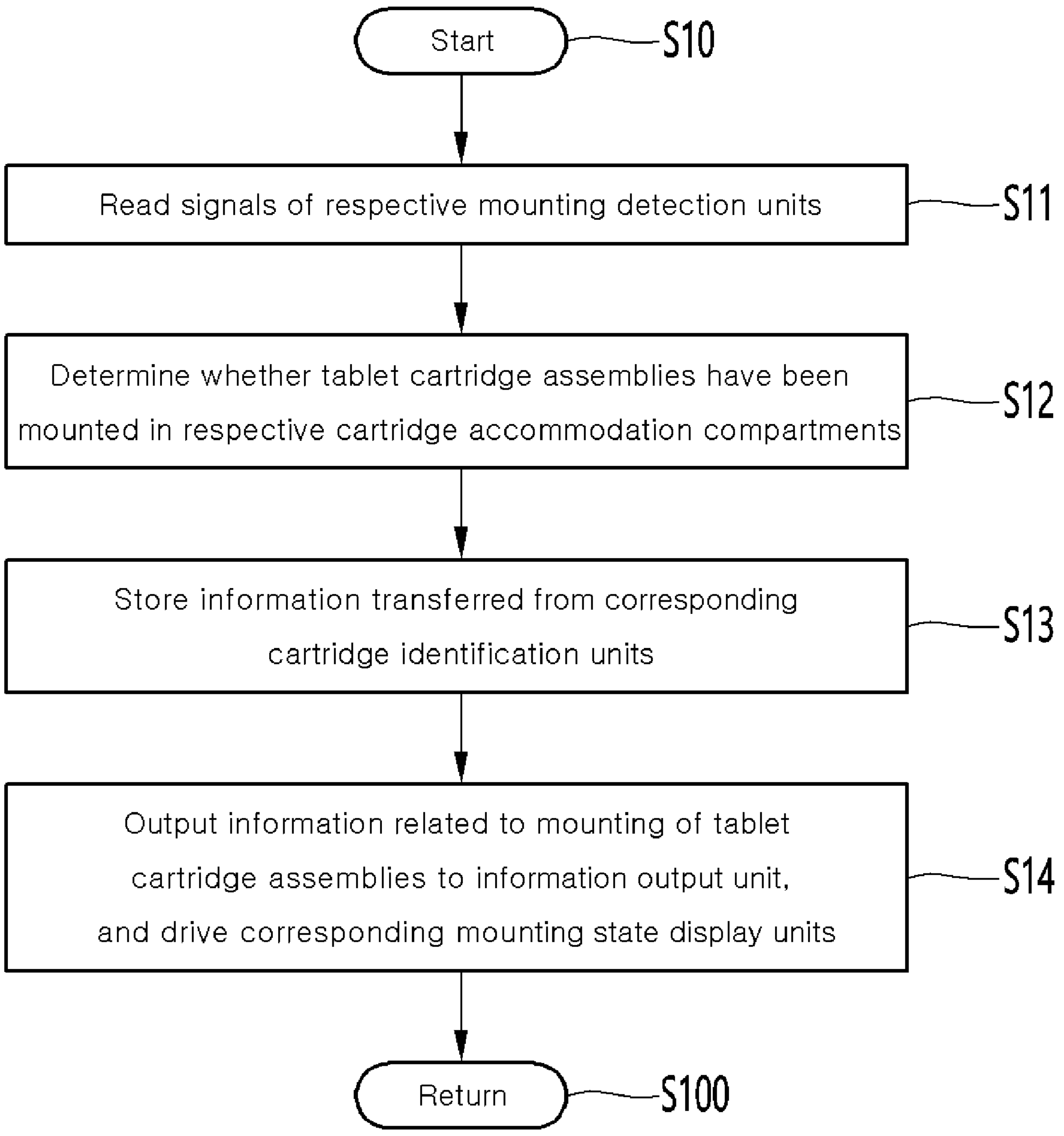
FIG. 7 is a flowchart of the operation of a control unit that detects a state in which a tablet cartridge assembly is mounted in a cartridge accommodation compartment in a tablet dispenser according to an embodiment of the present invention.

First, referring to FIG. 7, the operation of the control unit 20 when the tablet cartridge assemblies 40 are mounted in the accommodation part 52 of the tablet dispenser 1 will be described.

When a user appropriately install the tablet cartridge assemblies 40 by opening the top cover 55 of the tablet dispenser 1 and inserting the tablet cartridge assemblies 40 into the cartridge accommodation compartments H52, the control unit 20 may determine whether the tablet cartridge assemblies 40 are accommodated in the respective cartridge accommodation compartments H52 by using the respective installation detection units 13.

Accordingly, the control unit 20 may read signals applied from the respective mounting detection units 13 in step S11, and may determine one or more cartridge accommodation compartments H52 in which one or more corresponding tablet cartridge assemblies 40 have been appropriately mounted and one or more cartridge accommodation compartments H52 in which one or more corresponding tablet cartridge assemblies 40 have not been appropriately mounted among the plurality of cartridge accommodation compartments H52 by using the states of the read signals in step S12.

In this case, when the cartridge identification unit 131 in contact with a corresponding mounting detection unit 13 includes a storage medium such as a memory chip, an identification mark such as a QR code, or a short-distance communication module 112 such as an RFID or NFC tag, the control unit 20 may receive cartridge information (e.g., cartridge identification information and tablet information) from the cartridge identification unit 131 of the tablet cartridge assembly 40 accommodated in the corresponding cartridge accommodation compartment H52 through a corresponding mounting detection unit 13 or an information reader (e.g., a camera or an RIFD reader), and may store it in the storage unit 37 in step S13.

Then, the control unit 20 may drive the corresponding one of the plurality of mounting state display units corresponding to the mounted tablet cartridge assembly 40.

Thereafter, when the user closes the top cover 55 of the tablet dispenser 1, the mounting status of the tablet cartridge assembly 40 corresponding to the current mounting state of the tablet cartridge assembly 40 and tablet cartridge installation status indicative of determined cartridge information may be output to at least one of the display module 311 and audio output module 312 of the information output unit 31 by using the data stored in the storage unit 37 in step S14.

In this case, image data and voice data related to the tablet cartridge installation status have been already stored in the storage unit 37. Accordingly, the control unit 20 may output at least one of an image and a voice of the tablet cartridge installation status appropriate to the current state of the accommodation part 52 by using the data stored in the storage unit 37.

For example, when the top cover 55 of the tablet dispenser 1 is closed, the control unit 20 may detect the closing of the top cover 55 and allow information about the type of tablets (e.g., vitamin C) filled in a newly inserted tablet cartridge assembly 40 and the location number (e.g., No. 2) of the cartridge accommodation compartment H52 to be displayed as a pop-up image on the touch panel PL10 located on the top cover 55 by using cartridge information (e.g., cartridge identification information and tablet information) transferred from the cartridge identification unit 131 of the tablet cartridge assembly 40.

Figure 11B:
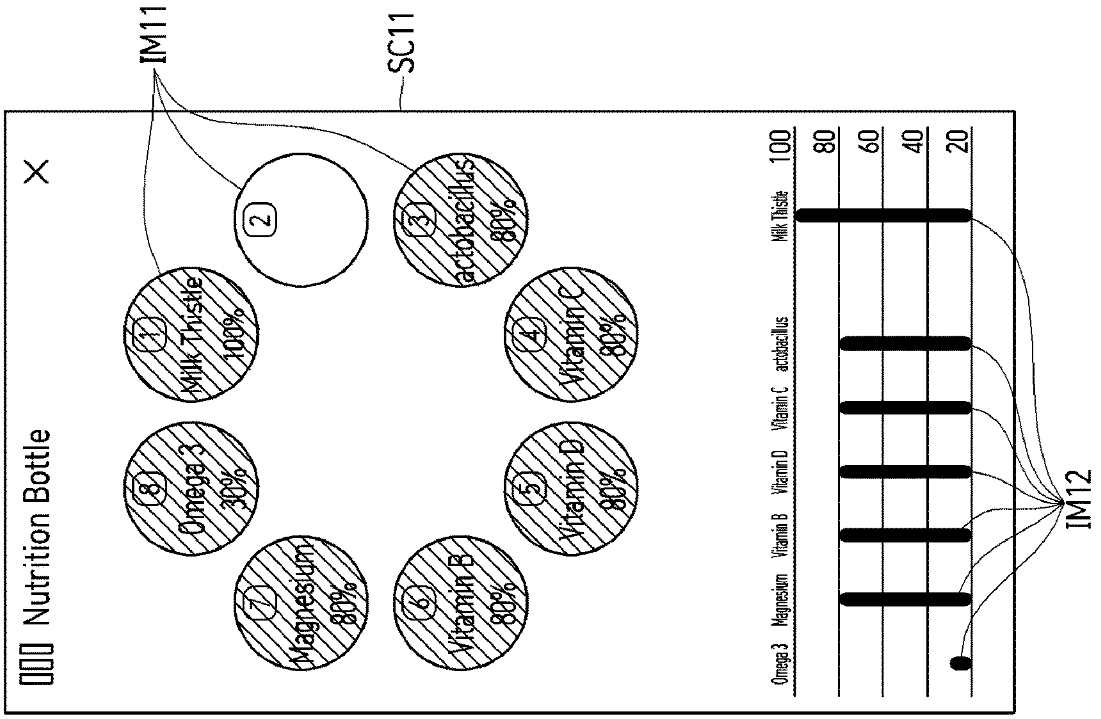
FIGS. 11A and 11B each show an example of an operation screen displayed on an information output unit according to the operation state of a tablet dispenser according to an embodiment of the present invention.
Figure 11A:
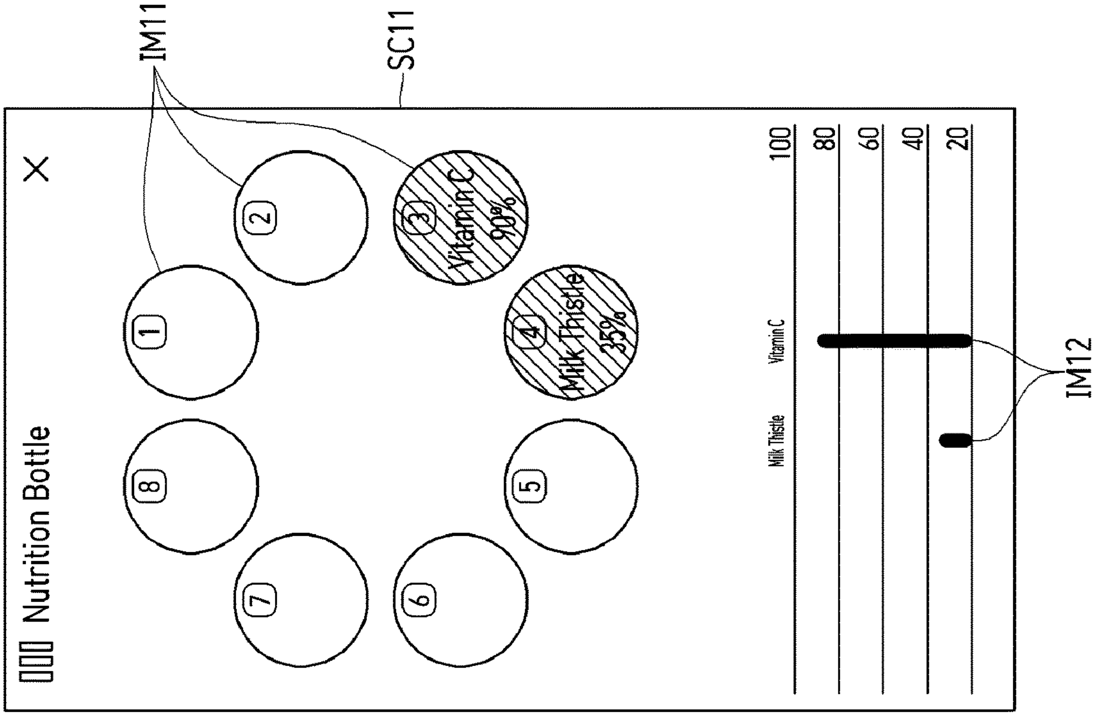

Furthermore, when the pop-up image disappears, the tablet dispenser 1 may provide a tablet cartridge installation display screen showing tablet cartridge installation status, as shown in FIG. 11(*a*).

Referring to FIG. 11(*a*), shape images (e.g., circular shapes) IM11 of cartridge accommodation compartments are displayed to be identical to the arrangement of cartridge accommodation compartments H52 currently arranged in the accommodation part 52 on a tablet cartridge mounting display screen. The information displayed in a shape image IM11 of each cartridge accommodation compartment H52 may vary depending on whether a tablet cartridge has been currently mounted.

In other words, as shown in FIG. 11(*a*), the numbers (e.g., 1, 2, and 5 to 8) of the cartridge accommodation compartments H52 may be displayed in the shape images IM11 of the cartridge accommodation compartments H52 corresponding to the accommodation part 52 in which the tablet cartridge assemblies 40 have not been mounted.

However, not only the numbers (e.g., 3 and 4) of the cartridge accommodation compartments H52 but also tablet information about mounted tablet cartridge assemblies 40, e.g., the types of tablets (e.g., vitamin C, and milk thistle) and current remaining tablet quantity information (e.g., 90%, and 35%), may be displayed in the shape images IM11 of the cartridge accommodation compartment H52 corresponding to the accommodation part 52 in which the tablet cartridge assemblies 40 have been mounted.

Furthermore, current remaining tablet quantity information for the types of tablets related to currently mounted tablet cartridge assemblies 40 is displayed as graphic images IM12 in the lower end of the tablet cartridge mounting display screen.

In an alternative example, when the cartridge identification units 131 are composed of passive elements such as resistors, the control unit 20 may determine whether tablet cartridge assemblies 40 have been installed in the cartridge accommodation compartments H52 and the identification information (i.e., cartridge identification information) of the mounted tablet cartridge assemblies 40 by using signals applied from corresponding installation detection units 13.

In this case, the control unit 20 may determine the identification information of the mounted tablet cartridge assemblies 40 by using the states of signals applied from the respective installation detection units 13, may read data (e.g., cartridge information) corresponding to the determined cartridge identification information using the data stored in the storage unit 37, and may output the data to the information output unit 31.

Furthermore, in an alternative example, the control unit 20 may receive data corresponding to the cartridge identification information from the management server 2 and output the data instead of reading it from the storage unit 37. To this end, the control unit 20 may transmit the determined cartridge identification information to the management server 2 through the communication unit 11, and the control unit of the management server 2 may read data (e.g., tablet information) corresponding to the transmitted cartridge identification information from a database or storage unit and transmit it to the tablet dispenser 1. Accordingly, the control unit 20 of the tablet dispenser 1 may output data, (e.g., tablet information) transmitted from the management server 2 through the communication unit 11, to the information output unit 31.

Figure 8A:
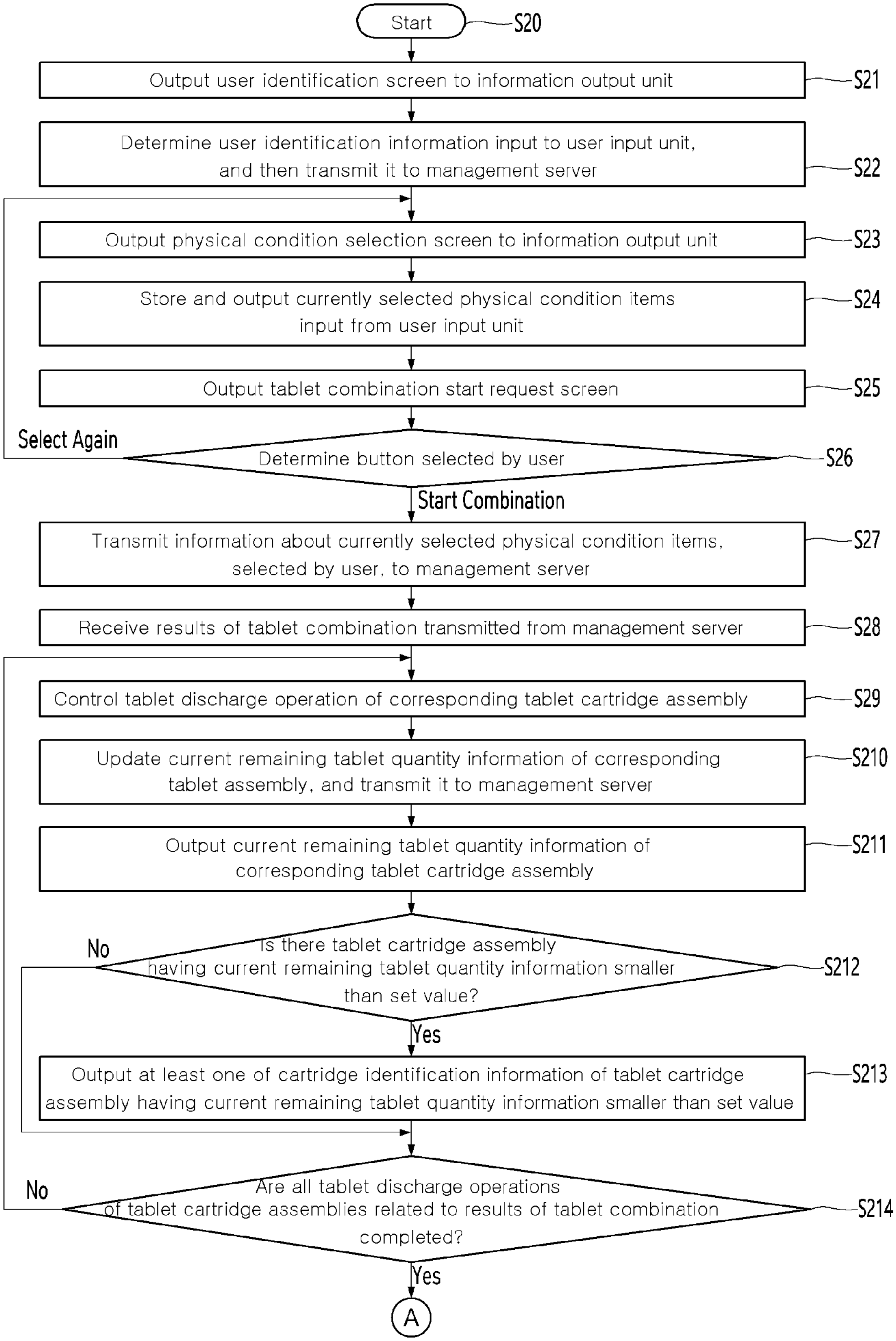
FIGS. 8A and 8B are flowcharts of a method for controlling a tablet dispenser according to an embodiment of the present invention.
Figure 8B:
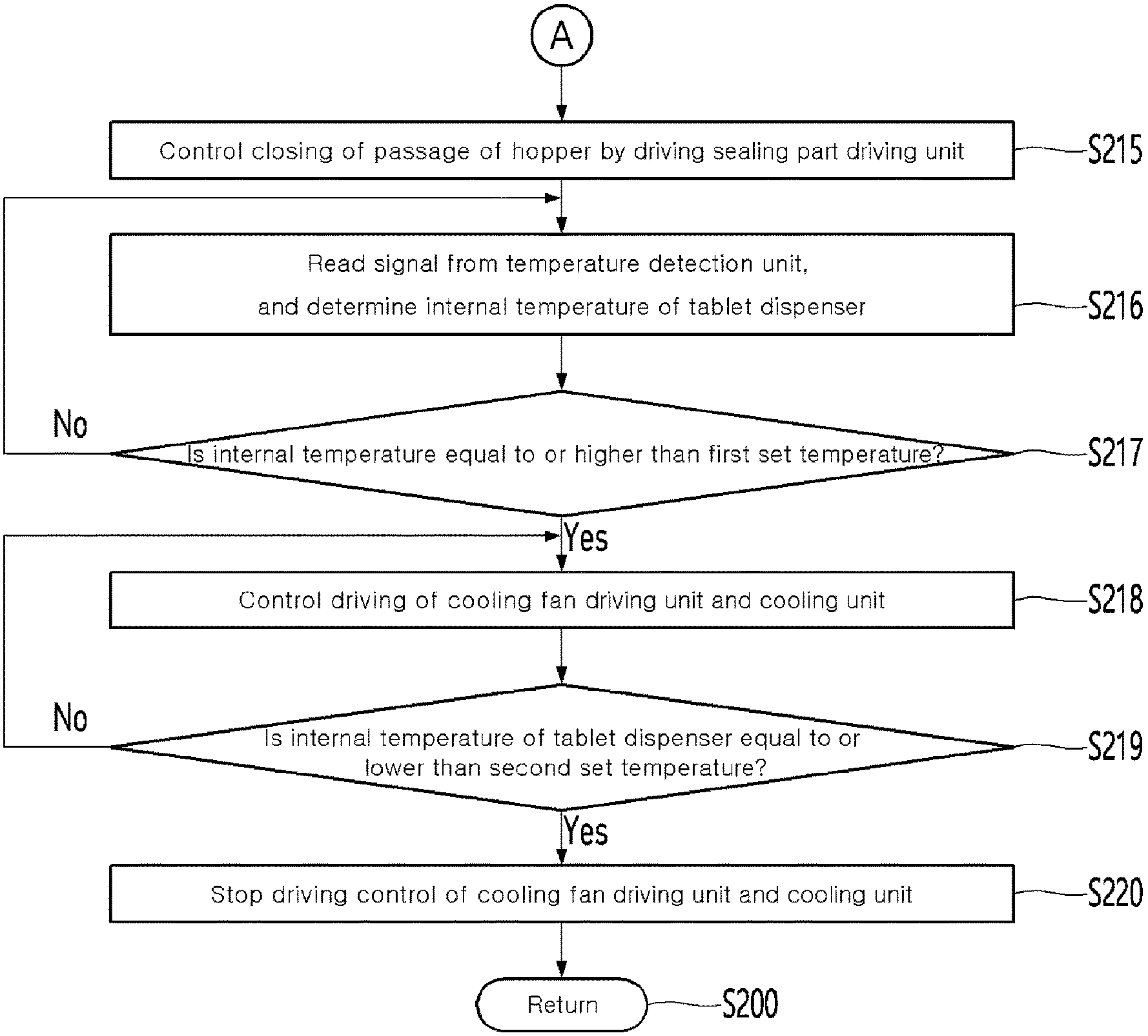

Next, referring to FIGS. 8A and 8B, the operation of the tablet dispenser 1 will be described.

First, the control unit 20 may output a user identification screen SC21 for user identification to the information output unit 31 by using the data stored in the storage unit 37 in step S21.

Figure 12A:
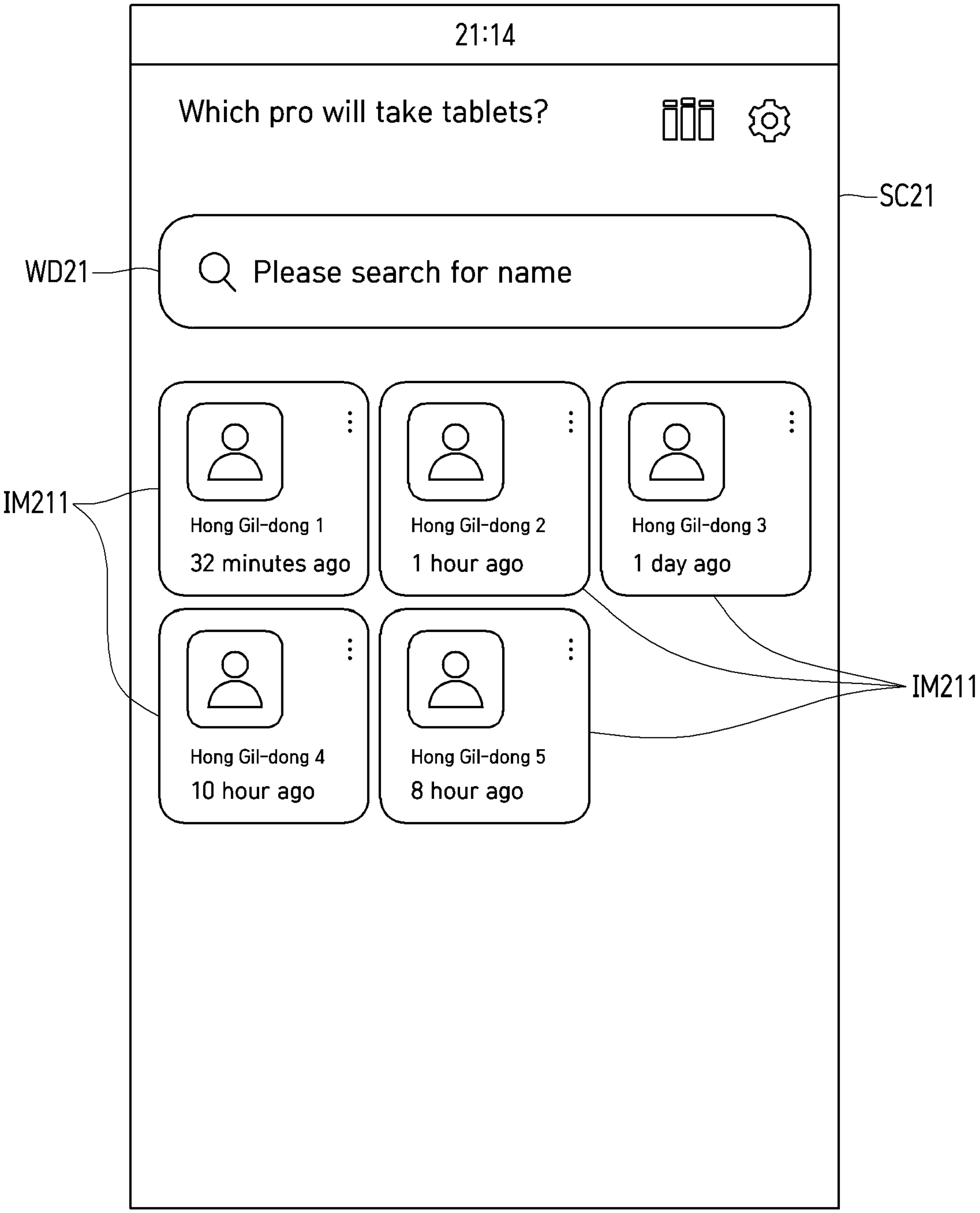
FIGS. 12A, 12B and 12C each show an example of an operation screen displayed on an information output unit according to the operation state of a tablet dispenser according to an embodiment of the present invention.

FIG. 12A shows an example of the user identification screen SC21. As shown in FIG. 12A, user images IM211 configured to display the names and photos of users, including a guest, and a search box WD21 configured to enable the users to be searched may be displayed on a user identification screen SC21.

Accordingly, a user may input his or her identification information (e.g., user identification information) using the user input unit 12 or the short-distance communication module 112 (e.g., an NFC or RFID module) of the communication unit 11.

When user identification information is input through the user input unit 12 or the communication unit 11, the control unit 20 may determine the input user identification information and then transmit it to the management server 2 through the communication unit 11 in step S22.

The management server 2 may store the user identification information, transmitted from the tablet dispenser 1, in the storage unit 37.

Figure 12B:
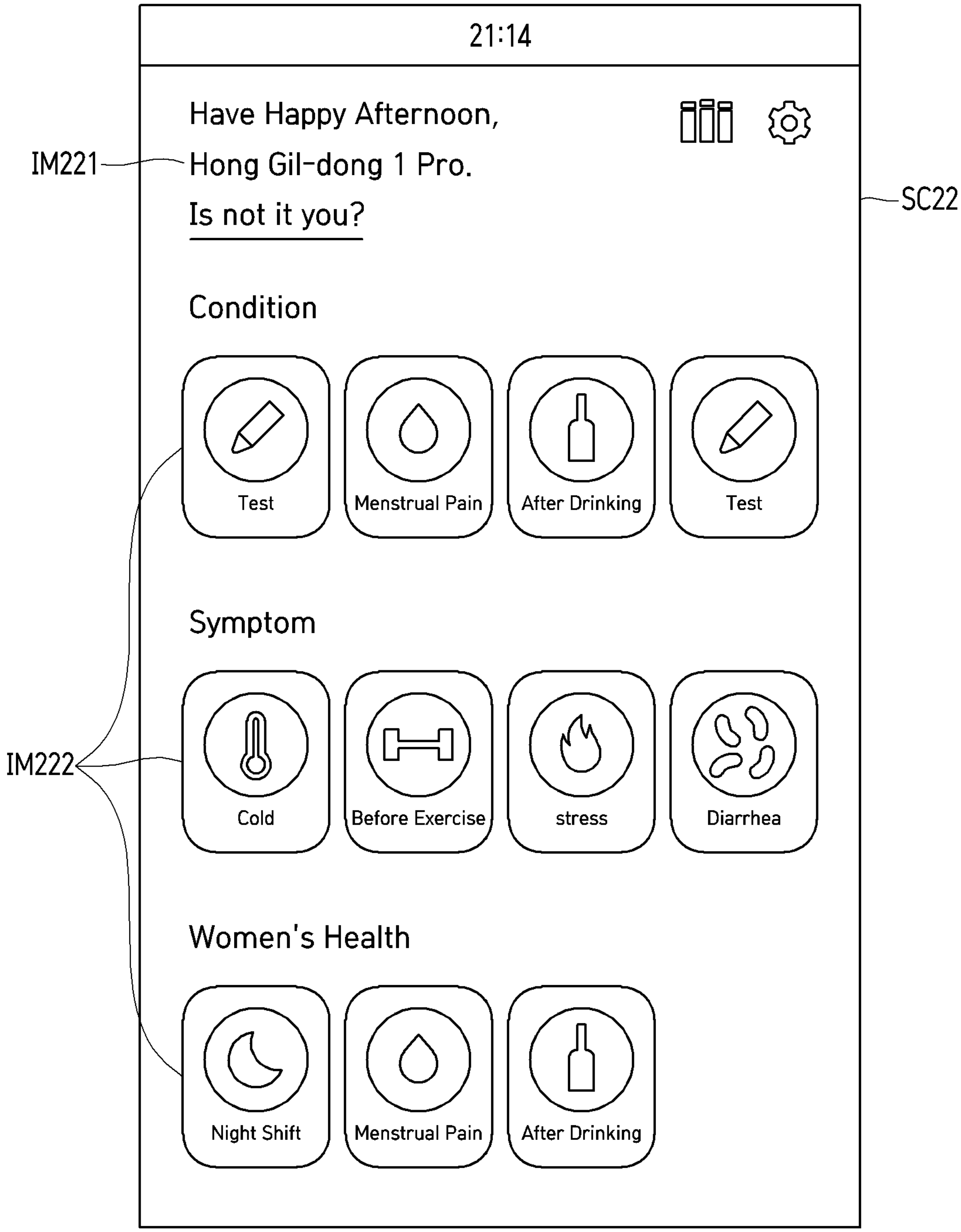

Furthermore, when the user identification information is determined in step S22, the control unit 20 may output a physical condition selection screen SC22 in which the current physical conditions of the user determined using the data stored in the storage unit 37 can be selected in step S23. An example of this physical state selection screen SC22 is shown in FIG. 12B.

In this case, the physical condition selection screen may display information IM221 about a current user (e.g., a name) and images IM222 of various items configured to enable them to be selected by the user. These items IM222 may be basically classified into conditions, symptoms, women's health, and moods.

Accordingly, the user may select an item suitable for his or her current physical conditions from among various items, output onto a physical condition selection screen SC22, by using the user input unit 12.

When the selection operation of the user is performed, the control unit 20 may read a signal input from the user input unit 12, determine the item selected by the user, store it in the storage unit 37, and output the current physical condition selection item as an image to the information output unit 31 so that the user can check the item selected by him or her in step S24.

Figure 12C:
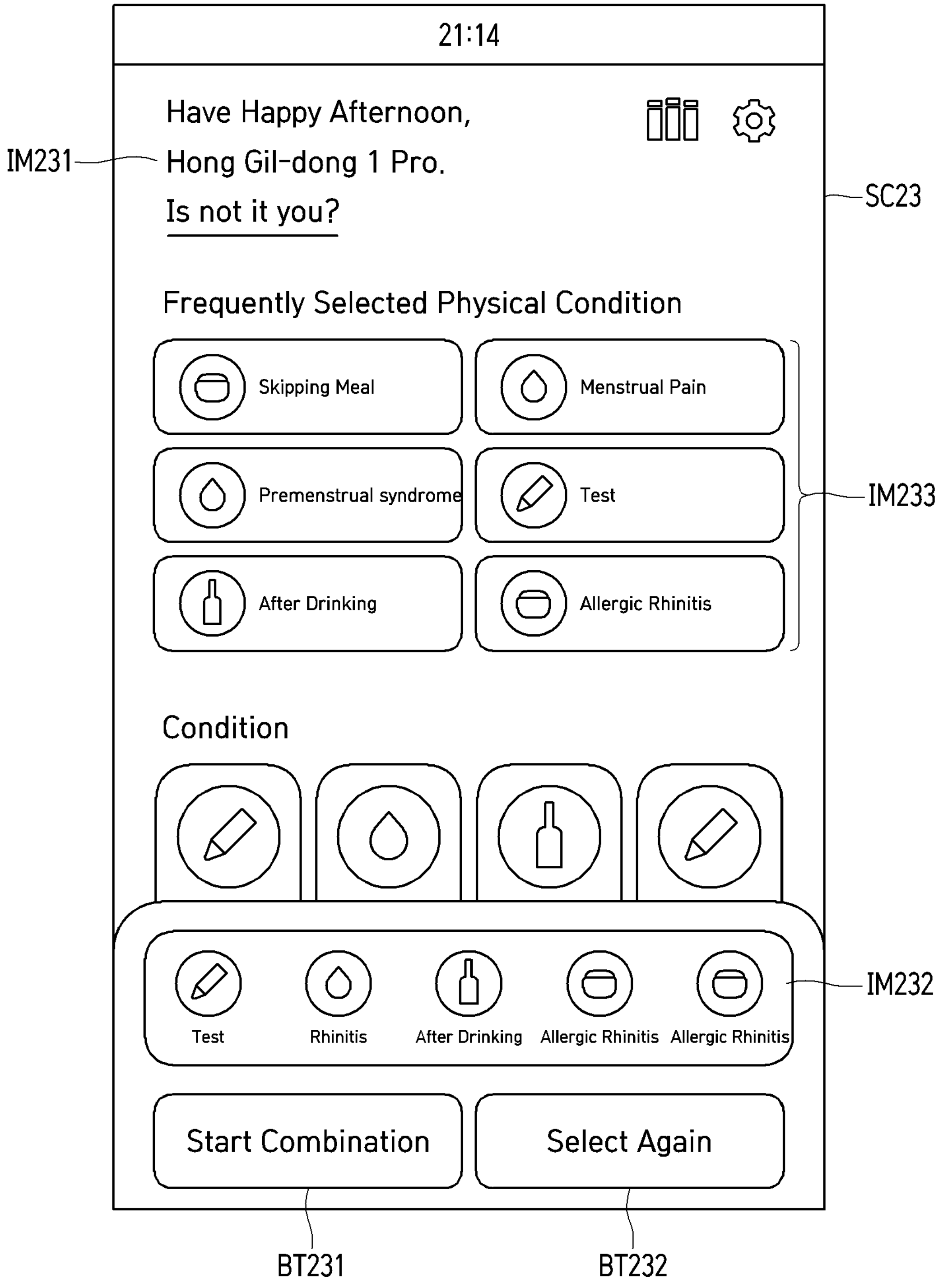

When the selection of the item suitable for the current physical conditions is completed using the user input unit 12, the control unit 20 may output a tablet combination start request screen SC23 for a tablet combination suitable for the current physical conditions of the user, as shown in FIG. 12C, in step S25.

As shown in FIG. 12C, the tablet combination start request screen SC23 may include information IM231 about the current user, items IM232 selected by the current user according to his/her physical conditions, a 'Start Combination' button BT321 configured to request the start of a tablet combination, and a 'Reselect' button BT232 configured to enable items corresponding to the physical conditions to be reselected.

In this case, the physical condition items IM233 frequently selected by the user may be information received from the management server 2. To this end, when user identification information for a user who wants to use the tablet dispenser 1 is transmitted, the management server 2 may extract the items, selected by the user in a databases or the like during the period before a predetermined period of time (e.g., 1 month ago) from the present by using data corresponding to user identification information, as data on frequently selected physical conditions, and may then transmit it to the tablet dispenser 1.

In this way, when a tablet combination start screen SC23 is output onto the information output unit 31, a user may select the 'Start Combination' button BT231 using the user input unit 12 so that a tablet combination suitable for currently selected physical conditions can be constructed, or may select physical conditions again using the 'Reselect' button BT232.

Accordingly, when it is determined that a signal for the 'Reselect' button BT232 has been input from the user input unit 12, the control unit 20 may proceed to step S23 and output the physical condition selection screen SC22 to the information output unit 31.

However, when it is determined that a signal for the 'Start Combination' button BT231 has been input from the user input unit 12 in step S26, the control unit 20 may transmit information about currently selected items for physical conditions, currently selected by the user, to the management server 2 through the communication unit 11 in step S27. In this case, the control unit 20 may also transmit user identification information.

Accordingly, the control unit of the management server 2 may store the transmitted information about currently selected items for physical conditions in the storage unit, and may perform a tablet combination operation intended to derive a tablet combination suitable for the current physical conditions of the user by using the user basic information corresponding to the user identification information stored in the database and the transmitted currently selected items for physical conditions, thereby deriving the results of a tablet combination. In this case, the results of the tablet combination may be the types, discharge quantity (e.g., discharge number), administration method, and single dose of one or more tablets to be currently taken. In this case, the administration method includes administration in the morning, administration in the afternoon, administration in the evening, administration before bedtime, administration on an empty stomach, administration before a meal, administration after a meal, and administration between meals.

Then, the control unit of the management server 2 may transmit the selected results of a tablet combination to the tablet dispenser 1 through the communication unit 11.

Accordingly, the control unit 20 of the tablet dispenser 1 may receive the results of a tablet combination transmitted from the management server 2 in step S28. The control unit 20 of the tablet dispenser 1 may control the discharge operation of at least one tablet cartridge assembly 40 accommodating the tablets T10 belonging to the results of the tablet combination so that a number of tablets T10 suitable for the discharge quantity can be discharged from the tablet cartridge assembly 40 in step S29.

Figure 9A:
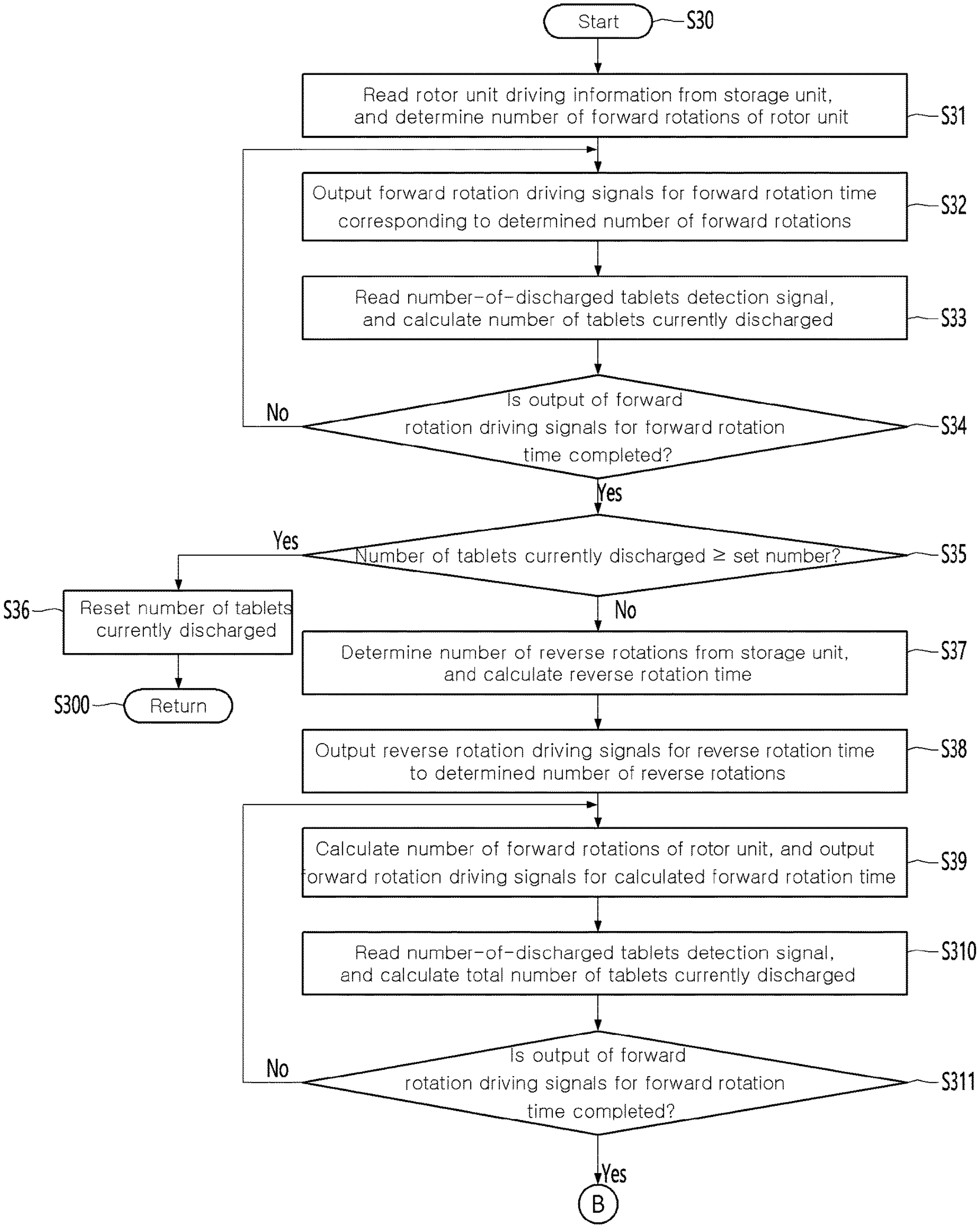
FIGS. 9C and 9B are operation flowcharts of the step of controlling a tablet cartridge assembly shown in FIG. 8A.
Figure 9B:
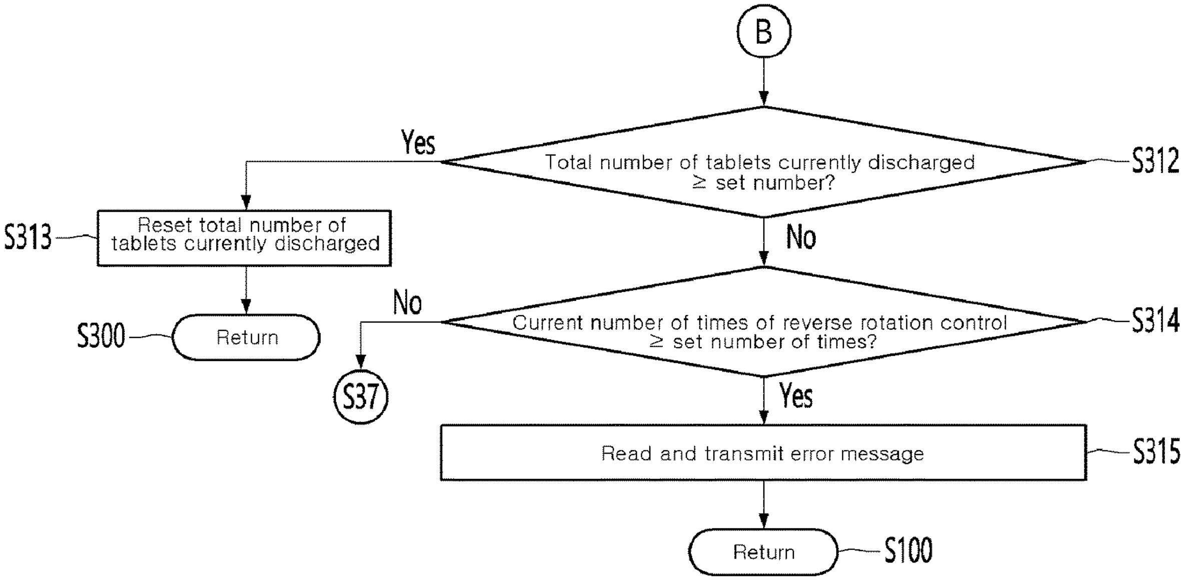
Figure 10:
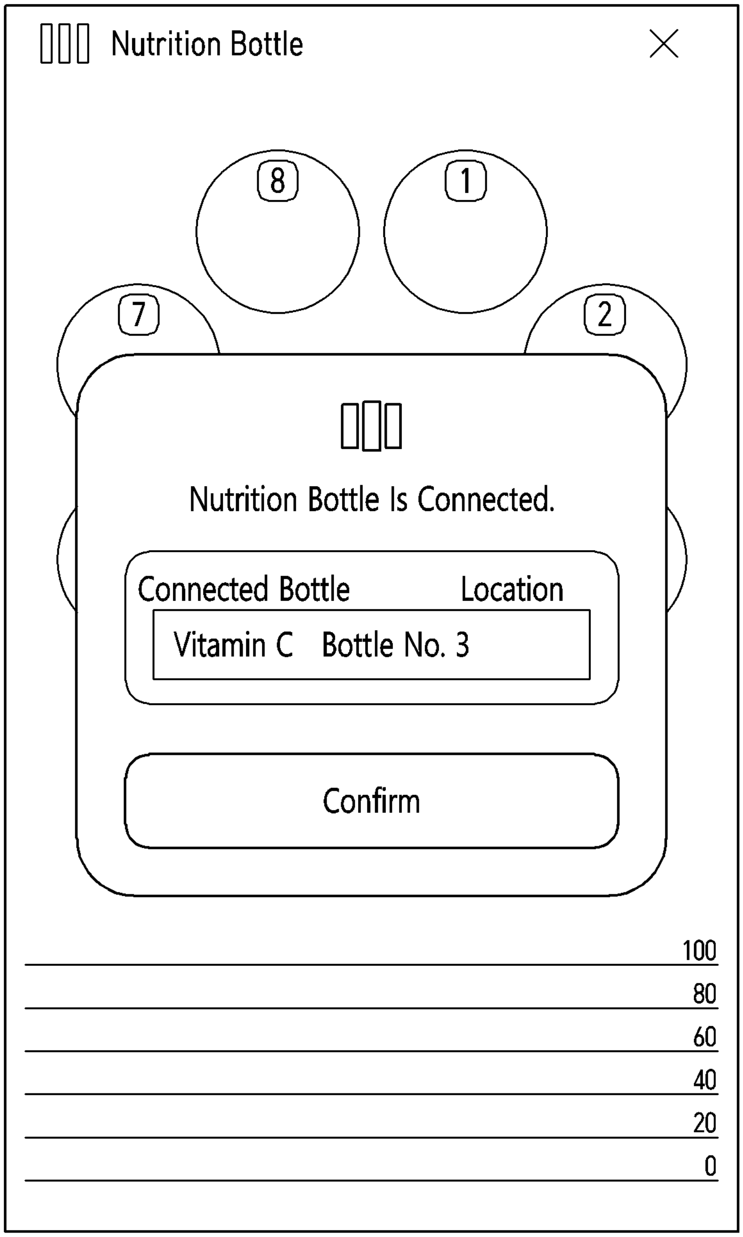
FIG. 10 shows an example of an operation screen displayed on an information output unit according to the operation state of a tablet dispenser according to an embodiment of the present invention.

The tablet discharge control operation of the control unit 20 for discharging the tablets T10 from the corresponding tablet cartridge assembly 40 will be described in detail below with reference to FIGS. 9A and 9B.

When the operation of discharging tablets corresponding to a predetermined discharge quantity from the corresponding tablet cartridge assembly 40 is completed in step S29 as described above, the control unit 20 may update the current remaining tablet quantity information for the corresponding tablet cartridge assembly 40 stored in the storage unit 37 and additionally transmit it to the management server 2 through the communication unit 11 in step S210.

Furthermore, when the cartridge identification unit 131 is a storage medium such as a memory chip that is readable and writable, the control unit 20 may perform an operation of writing the newly calculated current remaining table quantity information on the cartridge identification unit 131, and may ensure that the tablet information stored in the cartridge identification unit 131 is also stored correctly according to a current state.

When the current remaining tablet quantity information is transmitted from the tablet dispenser 1 in step S210, the control unit 20 of the management server 2 may update the current remaining tablet quantity information for the corresponding tablet dispenser (1) assembly, determined using the cartridge identification information transmitted together, with the transmitted current remaining tablet quantity information.

Thereafter, the control unit 20 may output the updated current remaining tablet quantity information to the information output unit 31 (e.g., the display module 311) in step S211, thereby allowing a manager or the like to accurately check the current remaining tablet quantity information for the tablet cartridge assembly 40.

Next, the control unit 20 may determine whether there is a tablet cartridge assembly 40 having current remaining tablet quantity information smaller than a set value among the pieces of current remaining tablet quantity information for the respective tablet cartridge assemblies 40 in step S212.

When there is a tablet cartridge assembly 40 having current remaining tablet quantity information smaller than a set value, the control unit 20 may output at least one of cartridge identification information and tablet information for the corresponding tablet cartridge assembly 40 to the information output unit 31 in step S213.

As an example, when the number of tablets in any one of the tablet cartridge assemblies 40 mounted into the cartridge accommodation compartments H52 is smaller than the set value, a mark notifying that the remaining quantity of the tablet cartridge assembly 40 is insufficient may be displayed on a tablet cartridge installation display screen.

More specifically, as shown in FIG. 11(*b*), when the remaining quantity information of the omega-3 tablets in the 8th cartridge accommodation compartment H52 is smaller than a threshold, the control unit 20 may display an image IM11 representing the 8th cartridge accommodation compartment H52 differently from an image IM11 of another cartridge accommodation compartment H52 having a sufficient remaining quantity.

As an example, a circular image area representing the 8th cartridge accommodation compartment H52 may be displayed in a different color, or a text representing remaining quantity information may be displayed in a different size or color. A separate mark indicating an insufficient remaining quantity may be displayed in the circular image representing the cartridge accommodation compartment H52.

Due to this, a user may easily replenish the corresponding tablets T10 or replace an existing cartridge assembly with a new tablet cartridge assembly 40 using the information output from the information output unit 31.

Furthermore, when a tablet discharge operation for all tablet cartridge assemblies 40 related to the selected results of a tablet combination is completed in step S214, the control unit 20 may determine that all tablet discharge operations for the current user have been completed. Accordingly, the control unit 20 outputs a driving signal for a corresponding state to the sealing part driving unit 34 so that the sealing part 341 can close the discharge passage P91 of the hopper 91 in step S215.

Once all the tablet discharge operations in all tablet cartridge assemblies 40 related to the results of a tablet combination have been completed, the discharge passage P91 of the hopper 91 is closed, so that foreign substances such as dust and moisture can be prevented from entering the tablet cartridge assemblies 40 through the hopper 91.

Next, when the discharge passage P91 of the hopper 91 is blocked by the sealing part 341, the control unit 20 reads a signal applied from the temperature detection unit 14, thereby determining the internal temperature of the tablet dispenser 1 in step S216.

Accordingly, when the determined internal temperature is equal to or higher than a set temperature (e.g., a first set temperature) in step S217, the control unit 20 outputs driving signals to the cooling fan driving unit and the cooling unit 33 in step S218 to operate the cooling fan and the cooling unit 33, so that a cooling operation for the tablet dispenser 1 can be performed.

When the temperature detected by the temperature detection unit 14 falls below a set temperature (e.g., a second set temperature) due to the operation of the cooling fan and the cooling unit 33 in step S219, the control unit 20 may stop the output of the driving signals applied to the cooling fan driving unit and the cooling unit 33 in step S220. In this case, the second set temperature may be lower than the first set temperature.

In the present example, the control unit 20 may also output the state of the sealing part 341, i.e., whether the discharge passage P91 of the hopper 91 has been closed, the measured internal temperature of the tablet dispenser 1, and whether the cooling fan and cooling unit 33 are driven through the information output unit 31. In this case, the manager of the tablet dispenser 1 or the like may check the operating state of the tablet dispenser 1 using the output information of the information output unit 31.

As described above, according to the present example, the operating state of the tablet dispenser 1, the state of the accommodation part 52, the current states of the accommodated tablet cartridge assemblies 40 may be output to the information output unit 31 in real time. Accordingly, the user and the manager may easily and rapidly determine the current operating state of the tablet dispenser 1 and the current states of the accommodated tablet cartridge assemblies.

Therefore, the manager may replenish the relevant tablets T10 when the quantity of accommodated tablets remains below a set value, and may also inspect the table cartridge assembly 40 for which a discharge operation has not been performed normally.

In addition, the user may check a tablet combination suitable for his or her current physical conditions, and may prevent side effects caused by the administration of tablets unsuitable for his or her physical conditions and the administration of a wrong dosage.

Next, referring to FIGS. 9A and 9B, the operation of controlling the tablet cartridge assemblies 40 performed to discharge the corresponding tablets T10 according to the results of a tablet combination will be described.

First, the control unit 20 may determine the tablet cartridge assemblies 40 to be operated using a transmitted tablet combination and the driving information (i.e., the number of forward rotations of the rotor unit) of the corresponding tablet cartridge assemblies 40 in step S31.

In this case, the control unit 20 may determine the tablet cartridge assemblies 40 to be operated according to the types of tablets to be discharged, and may determine the driving information of the rotor unit 423 according to the quantity of tablets to be discharged.

Since the number of tablets discharged in one rotation can already be known, the control unit 20 may calculate the number of rotations (e.g., the number of rotations in the forward direction) of the rotor unit 423 for discharging a determined number of tablets according to the quantity of corresponding tablets.

When the tablet cartridge assemblies 40 from which the corresponding tablets T10 will be discharged are determined and the driving information of the rotor unit 423 for each of the tablet cartridge assemblies 40 is determined, the control unit 20 may output forward rotation drive signal to the corresponding discharge drivers 35 for a forward rotation time (e.g., a first forward rotation time) corresponding to the determined number of forward rotations for the discharge operation (e.g., forward rotation operation) of the rotor unit 423 of each of the determined tablet cartridge assemblies 40 in step S32. Accordingly, the rotor unit 423 of the tablet cartridge assembly 40 may be rotated forward according to the rotational operation of the discharge driving unit 35 and discharge the tablets T10 toward the discharge unit 91.

In the present example, the rotation speed of the rotor unit 423 is already fixed, so that, when the number of forward rotations or reverse rotations is determined, a corresponding reverse rotation time and forward rotation time can also be easily calculated.

When the rotor unit 423 starts to rotate normally as described above, the control unit 20 or 1023 may read a detection signal applied from the tablet discharge detection unit 15, may calculate the number of the corresponding type of tablets T10 currently discharged, and may store it in the storage unit 37 in step S33.

This operation of calculating the number of tablets currently discharged may continue while the forward rotation operation of the rotor unit 423 is performed.

Thereafter, when the output of the forward rotation drive signal is completed for a time corresponding to the determined number of forward rotations in step S34, the control unit 20 may determine whether the number of currently discharged tablets stored in the storage unit 37 or 1024, i.e., the total number of the corresponding type of tablets T10 discharged during the corresponding time, is equal to a set number in step S35. In this case, the set number may be determined according to a dosage for the corresponding type of tablets T10 and stored in the storage unit 37.

When the number of tablets currently discharged is equal to the set number in step S35, the control unit 20 may determine that the corresponding type of tablets T10 have been normally discharged at a predetermined dosage. Accordingly, the control unit 20 may reset the number of tablets currently discharged to ‘0’ in step S36, and may then proceed to a return step S300.

However, when the number of tablets currently discharged does not reach the set number in step S35, i.e., when the tablets T10 of the corresponding type have not been discharged as much as the set dose, the control unit 20 may determine that the smooth discharge of the tablets is not achieved due to the blockage of the discharge output H422 or a plurality of tablets T10 located to overlap each other.

Accordingly, the control unit 20 allows an insufficient number of tablets to be discharged by rotating the rotor unit 423 in the reverse direction for a predetermined time and then performing a forward rotation operation again.

To this end, the control unit 20 may read the number of reverse rotations of the rotor unit 423 using data stored in the storage unit 37 and then calculate the reverse rotation time of the rotor unit 423 in step S37. In the present example, the number of reverse rotations for one reverse rotation control may already be determined.

Although the reverse rotation time for one reverse rotation control is calculated using the number of reverse rotations in the present example, a reverse rotation time for one reverse rotation control may be directly stored in the storage unit 37 or 1024 in an alternative example.

Thereafter, the control unit 20 may output a control signal of a corresponding state to the corresponding discharge driving unit 35 during the reverse rotation time in order to perform the reverse rotation of the rotor unit 423 during the reverse rotation time for the corresponding reverse rotation control in step S38. In this case, the control unit 20 may increase a reverse rotation control count (initial value=0) by ‘1’ and store it in the storage unit 37 in step S38.

Accordingly, the rotor unit 423 may perform a reverse rotation operation for a set reverse rotation time under the control of the discharge driving unit 35.

In the present example, when the rotor unit 423 is rotated in reverse, the tablet T10 present in the discharge unit 402 is not discharged. Only during normal rotation may the tablet T10 be discharged normally.

After the reverse rotation drive signals have been output for the determined reverse rotation time as described above, the control unit 20 may determine the number of forward rotations of the rotor unit 423 again, may calculate the forward rotation time (e.g., a second forward rotation time), and may then output a forward drive signal to the discharge driving unit 35 or 1025 during the calculated second forward rotation time in step S39.

In this case, the number of forward rotations of the rotor unit 423 may be determined by the number of tablets calculated by subtracting the number of tablets currently discharged from the set number, i.e., the number of tablets to be additionally discharged. Accordingly, the second forward rotation time may be shorter than the first forward rotation time.

In step S39, after outputting a forward rotation driving signal for the additional discharge of an insufficient number of tablets to the discharge driving unit 35, the control unit 20 may read a detection signal applied from the tablet discharge detection unit 15 and determine whether the additional discharge of tablets T10 has occurred, may calculate the total number of tablets currently discharged, and may store it in the storage unit 37 in step S310. In this case, the total number of tablets currently discharged may be the total number of tablets T10 discharged during a total forward rotation time (e.g., the first forward rotation time+the second forward rotation time) after the discharge operation of tablets has started.

Thereafter, after the forward rotation of the rotor unit 423 has been performed for the forward rotation time determined in step S39 in step S311, the drive control unit 20 or 1023 may determine whether the current total number of discharges stored in the storage unit 37 has reached the set number in step S312.

When the total number of tablets currently discharged is equal to the set number in step S312, the control unit 20 may determine that a corresponding type of tablets T10 have been normally discharged at a determined dosage, may reset the total number of tablets currently discharged to '0' in step S313, and may then proceed to a return step S300.

However, when the total number of tablets currently discharged does not reach the set number in step S312, i.e., when an insufficient number of tablets are not discharged normally, the control unit 20 may determine whether a current reverse rotation control number has reached a set number in step S314.

In the present example, the current reverse rotation control count may be the total number of times the reverse rotation drive signal is output based on the results of a tablet combination after a first forward rotation drive signal for discharging the corresponding tablets T10 has been output, the control unit 20 may increase the current reverse rotation control count by '1' each time reverse rotation control ends.

Accordingly, when the current reverse rotation control number does not reach the set number in S314, the control unit 20 may proceed to step S37 and control the reverse rotation operation of the rotor unit 423 for the next (e.g., second) reverse rotation control count.

However, when the current reverse rotation control number reaches the set number in step S314, the control unit 20 may determine that the tablet cartridge assembly 40 has not performed normal tablet discharge due to a blocking phenomenon.

Accordingly, the control unit 20 may read an error message stored in the storage unit 37 and output it to the information output unit 31 and may additionally transmit it to the management server 2 through the communication unit 11 to output it in step S315.

Therefore, the user can use the error message output to the information output unit 31 to recognize which formulation cartridge assembly 40 has not performed normal tablet discharge, so that the user can check the status of the corresponding formulation cartridge assembly 40.

For this reason, when the tablets T10 are not discharged at the determined dosage, the control unit 20 repeats the reverse rotation and forward rotation operation of the rotor unit 423 a set number of times to perform the additional discharge the tablets T10, thereby ensuring that a number of tablets T10 corresponding to the results of a tablet combination has been discharged normally.

The technical features disclosed in the respective embodiments of the present invention are not limited to the corresponding embodiments, and the technical features disclosed in the respective embodiments may be combined and applied to other embodiments unless they are incompatible with each other.

Therefore, while the individual embodiments have been described with a focus on respective technical features, they may be applied in combination with each other unless the technical features are incompatible with each other.

The present invention is not limited to the above-described embodiments and the accompanying drawings, and various modifications and variations may be made from the perspective of a person having ordinary skill in the art to which the present invention pertains. Therefore, the scope of the present invention should be determined not only by the claims of this specification but also by equivalents to these claims.

The invention claimed is:

1. A tablet cartridge assembly comprising:

a cartridge configured such that one end thereof is open and a remaining end thereof is closed and such that tablets are accommodated therein; and a discharge unit coupled to the one end of the cartridge to selectively mount and separate the cartridge into and from a tablet dispenser, and configured to discharge tablets from the cartridge;

wherein the discharge unit includes:

a housing provided with an outer wall forming an internal space, in which the outer wall has a first portion coupled to the one end of the cartridge and a second portion configured to be selectively attached and detached to and from the tablet dispenser, and configured to accommodate the tablets, accommodated in the cartridge, into the internal space as the cartridge is coupled to the first portion; and a rotor unit coupled in the housing to be rotatable in the internal space, and configured to discharge the tablets toward the tablet dispenser by rotation in the internal space;

wherein a discharge outlet for discharging the tablets and a portion of the rotor unit for receiving external rotational force and allowing rotation of the rotor unit are exposed through the second portion; and wherein the discharge unit further includes a cartridge identification unit configured to store cartridge information for identifying the tablets accommodated in the cartridge coupled to the housing.

2. The tablet cartridge assembly of claim 1, wherein the first portion is detachably screw-coupled to the one end of the cartridge.

3. The tablet cartridge assembly of claim 2, wherein:

the one end of the cartridge is provided with a first screw thread so that the one end of the cartridge and the first portion are detachably coupled to each other; and the first portion of the discharge unit is provided with a second screw thread that is engaged with the first screw thread as the cartridge rotates.

4. The tablet cartridge assembly of claim 1.

wherein the cartridge identification unit is provided in a form of any one of a storage medium, a passive element, an quick response (OR) code identification mark, a radio frequency identification (RFID) tag, and a non-fungible token (NFT) tag.

5. The tablet cartridge assembly of claim 1, wherein information identified by the cartridge information includes at least one of a type of tablets, a manufacturing date and time of the tablets, a distribution period of the tablets, an initial tablet quantity, and current remaining tablet quantity information.

6. The tablet cartridge assembly of claim 1, wherein the housing is further provided with an accommodation guide portion configured to guide the discharge unit through an insertion direction when the discharge unit is mounted into the tablet dispenser.

7. The tablet cartridge assembly of claim 6, wherein the accommodation guide portion is provided on the outer wall of the housing and has a shape corresponding to a shape of a cartridge accommodation compartment of the tablet dispenser into which the discharge unit is inserted.

8. The tablet cartridge assembly of claim 1, further comprising a discharge cap coupled to a remaining end of the housing and configured to block the remaining end of the housing;

wherein the discharge cap has a rotor insertion opening into which a driving shaft of the rotor unit is inserted, and the discharge outlet; and wherein the discharge outlet and the portion of the rotor unit are exposed from the remaining end of the housing through the discharge cap.

9. The tablet cartridge assembly of claim 1, wherein:

the rotor unit is provided with a tablet guide configured such that it is partially opened and thus a portion of the discharge cap is exposed and such that a tablet to be discharged to the discharge outlet is seated therein; and the tablet guide moves the tablet, seated therein, to the discharge outlet in response to rotation of the rotor unit.

10. A tablet dispenser comprising:

an accommodation unit provided with a plurality of cartridge accommodation compartments so that a plurality of tablet cartridge assemblies each having a structure of claim 1 can be selectively mounted therein and separated therefrom;

a plurality of discharge driving units located below the plurality of respective cartridge accommodation compartments, connected to rotor units of the tablet cartridge assemblies mounted in the respective cartridge accommodation compartments, and configured to drive the rotor units of the tablet cartridge assemblies;

mounting detection units configured to detect cartridge identification units of the tablet cartridge assemblies mounted in the respective cartridge accommodation compartments; and a control unit configured to control the discharge driving units and process signals received from the mounting detection units;

wherein, when the tablet cartridge assemblies are each mounted in any one of the plurality of cartridge accommodation compartments, the mounting detection unit automatically detects cartridge information about tablets stored in the tablet cartridge assembly.

11. The tablet dispenser of claim 10, wherein, when the tablet cartridge assembly is inserted into the cartridge accommodation compartment, the second portion provided in the discharge unit faces a bottom surface of the cartridge accommodation compartment.

12. The tablet dispenser of claim 10, further comprising a hopper located in a lower portion of the accommodation unit and configured to collect tablets discharged from the plurality of tablet cartridge assemblies and discharge them to an outside.

13. The tablet dispenser of claim 12, wherein:

when the tablet cartridge assembly is inserted into the cartridge accommodation compartment, the rotor unit of the tablet cartridge assembly is connected to a driving shaft of the discharge driving unit, and the discharge outlet of the tablet cartridge assembly communicates with a discharge path connected to the hopper; and as the discharge driving unit operates, one or more tablets accommodated in the tablet cartridge assembly are discharged into the hopper through the discharge outlet.

14. The tablet dispenser of claim 12, wherein the accommodation unit further includes a discharged tablet number detection unit located between bottoms of the discharge outlets provided in the plurality of respective cartridge assemblies and the hopper and configured to detect a number of tablets discharged from the plurality of tablet cartridge assemblies.

15. The tablet dispenser of claim 10, wherein information identified by the cartridge information includes at least one of a type of tablets, a manufacturing date and time of the tablets, a distribution period of the tablets, an initial tablet quantity, and current remaining tablet quantity information.

16. The tablet dispenser of claim 10, wherein:

the tablet cartridge assembly is replaceable, so that, when tablets accommodated in the tablet cartridge assembly mounted in any one of the plurality of cartridge accommodation compartments are exhausted, the tablet cartridge assembly is replaced with a new tablet cartridge assembly by a user; and the new tablet cartridge assembly includes a new cartridge, and a discharge unit having a cartridge identification unit configured to store cartridge information corresponding to the new cartridge.

17. The tablet dispenser of claim 10, wherein each of the plurality of cartridge accommodation compartments is provided in a form of a recessed hole extending in a vertical direction.

18. The tablet dispenser of claim 10, wherein:

each of the plurality of cartridge accommodation compartments further includes an accommodation guide having a shape corresponding to the accommodation guide portion; and when each discharge unit is inserted into the cartridge accommodation compartment, the accommodation guide portion is coupled to the accommodation guide.

19. The tablet dispenser of claim 10, wherein the accommodation unit further includes mounting state display units configured to display mounting states of the respective cartridge assemblies.

20. The tablet dispenser of claim 12, further comprising a sealing part configured to seal a lower end of the hopper through which the tablets are discharged to the outside; and wherein the hopper opens the lower end of the hopper while a tablet is being discharged from each of the plurality of tablet cartridge assemblies, and closes the lower end of the hopper when an operation of discharge from each of the plurality of tablet cartridge assemblies is completed.

* * * * *